US012388173B2

(12) United States Patent
Xing et al.

(10) Patent No.: US 12,388,173 B2
(45) Date of Patent: Aug. 12, 2025

(54) ANTENNA

(71) Applicant: Shanghai Tianma Microelectronics Co., Ltd., Shanghai (CN)

(72) Inventors: Yifan Xing, Shanghai (CN); Zhenyu Jia, Shanghai (CN); Xiaonan Han, Shanghai (CN); Baiquan Lin, Shanghai (CN); Kerui Xi, Shanghai (CN); Xiaojun Chen, Shanghai (CN); Yingru Hu, Shanghai (CN); Shengwei Dai, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 101 days.

(21) Appl. No.: 18/406,402

(22) Filed: Jan. 8, 2024

(65) Prior Publication Data

US 2024/0154303 A1 May 9, 2024

(30) Foreign Application Priority Data

Apr. 17, 2023 (CN) ........................ 202310410534.0

(51) Int. Cl.

| | |
|---|---|
| ***H01Q 1/52*** | (2006.01) |
| ***H01Q 1/48*** | (2006.01) |
| ***H01Q 1/50*** | (2006.01) |
| ***H01Q 3/36*** | (2006.01) |
| ***H01Q 21/00*** | (2006.01) |

(52) U.S. Cl.
CPC .............. *H01Q 1/523* (2013.01); *H01Q 1/48* (2013.01); *H01Q 1/50* (2013.01); *H01Q 3/36* (2013.01); *H01Q 21/0037* (2013.01); *H01Q 21/0075* (2013.01)

(58) Field of Classification Search
CPC ............ H01Q 1/523; H01Q 1/48; H01Q 1/50; H01Q 3/36; H01Q 21/0037; H01Q 21/0075
See application file for complete search history.

(56) References Cited

FOREIGN PATENT DOCUMENTS

| | | | |
|---|---|---|---|
| CN | 102280695 | A | 12/2011 |
| CN | 107437659 | A | 12/2017 |

*Primary Examiner* — Graham P Smith
(74) *Attorney, Agent, or Firm* — KDW FIRM PLLC

(57) ABSTRACT

An antenna is provided in this application. The antenna includes multiple radiating units, at least two adjacent radiating units are correspondingly provided with a respective decoupling structure, the decoupling structure includes two microstrip line units, one microstrip line unit of the two microstrip line units includes at least one microstrip line, and the two microstrip line units are located on two opposite sides of two radiating units in a direction perpendicular to an arrangement direction of two adjacent radiating units. According to the antenna provided in the embodiments of the present disclosure, the decoupling structure composed of the microstrip line are disposed on two sides of the at least two adjacent radiating units, so that an indirect coupling field is formed by the decoupling structure, and the indirect coupling field counteracts a direct coupling field between adjacent radiating units.

20 Claims, 22 Drawing Sheets

ANTENNA

CROSS-REFERENCE TO RELATED APPLICATION(S)

This application claims the priority of Chinese Patent Application No. 202310410534.0, filed on Apr. 17, 2023, the disclosure of which is incorporated herein by reference in its entirety.

TECHNICAL FIELD

The present disclosure relates to the field of communication technologies, and in particular to, an antenna.

BACKGROUND

With the gradual evolution of communication systems, antennas have gained more and more widespread applications. A phased array antenna is used as an example, in the related art, the phased array antenna includes multiple radiating units, and the multiple radiating units are configured to radiate out phase-shifted radio frequency signals to form a beam having a main lobe direction.

Radiating units in the related art are typically deployed on a same side of a substrate by using a metal film forming technology. As the miniaturization demand of the antennas is raised, on the basis of not degrading the performance of the antennas and the radiation performance, the multiple radiating units need to be densely arranged on a substrate with a smaller size. The mutual coupling between the radiating units may cause many negative effects on the antenna system performance of the multiple radiating units, such as radiation pattern distortion, radiation performance deterioration, input impedance and radiation impedance change, and antenna radiation efficiency reduction. Therefore, the reduction of mutual coupling effects between the radiating units and the improvement of isolation between the radiating units are one of important problems to be solved as the integration of the antennas increases and the miniaturization of the antennas advances.

SUMMARY

The present disclosure provides an antenna. The antenna includes a first substrate, multiple radiating units and at least one decoupling structure. The multiple radiating units are arranged in an array on a side of the first substrate. At least two adjacent radiating units among the multiple radiating units constitute one radiating unit group, and the radiating unit group includes a first radiating unit and a second radiating unit disposed adjacent to each other. The at least one decoupling structure is disposed in correspondence with the radiating unit group, one decoupling structure of the at least one decoupling structure includes two microstrip line units, and one microstrip line unit of the two microstrip line units includes at least one microstrip line. The first radiating unit and the second radiating unit are disposed on a same layer and arranged in a first direction. In a second direction, the two microstrip line units are located on two opposite sides of the radiating unit group, respectively, and a vertical projection of one microstrip line unit of the two microstrip line units on the first substrate and a vertical projection of other microstrip line unit of the two microstrip line units on the first substrate are symmetrically disposed about a center point of a vertical projection of the radiating unit group on the first substrate. The second direction intersects the first direction.

It should be understood that the contents described in this section are not intended to identify key or critical features of the embodiments of the present disclosure, nor intended to limit the scope of the present disclosure. Other features of the present disclosure will be readily understood from the following description.

BRIEF DESCRIPTION OF DRAWINGS

In order to more clearly explain the technical schemes in embodiments of the present disclosure, the drawings used for describing the embodiments will be briefly introduced below. Obviously, the drawings in the following description are some embodiments of the present disclosure. For those of ordinary skill in the art, other drawings may also be obtained without creative labor according to these drawings.

DETAILED DESCRIPTION

In order that schemes of the present disclosure may be better understood by those skilled in the art, the technical schemes in embodiments of the present disclosure will be described clearly and completely below in conjunction with the drawings in the embodiments of the present disclosure. Apparently, the described embodiments are merely part of the embodiments of the present disclosure, rather than all of the embodiments of the present disclosure. All other embodiments obtained by those of ordinary skill in the art based on the embodiments of the present disclosure without requiring creative efforts shall all fall within the scope of protection of the present disclosure.

The terms "first," "second," and the like in the Description and claims of the present disclosure, and in the foregoing drawings, are used for distinguishing between similar objects and not necessarily for describing a particular order or sequential order. It should be understood that the data so used may be interchanged under appropriate circumstances so that the embodiments of the present disclosure described herein are capable of being implemented in sequences other than those illustrated or described herein. Furthermore, the terms "include" and "have", as well as any variations thereof, are intended to cover a non-exclusive inclusion. For example, a process, a method, a system, a product, or an apparatus that includes a series of steps or units is not limited to those steps or units explicitly listed, but may include other steps or units not explicitly listed, or may include other steps or units inherent to such process, method, product, or apparatus.

The conventional antenna with multiple radiating units is usually not highly integrated and not compact in structure. A spacing between adjacent radiating units is set to be greater than or equal to 0.5$\lambda$ ($\lambda$ is an operating wavelength) and less than a maximum wavelength of grating lobes that occur, that is, a spacing d between adjacent radiating units, the spacing d satisfies $d<\lambda/(1+\sin\theta)$, where $\theta$ is a designed maximum scan angle. An antenna with an operating wavelength of 6 GHz is used as an example, the spacing between adjacent radiating units is greater than or equal to 0.5$\lambda$(~25 mm), so that the isolation between adjacent radiating units may be ensured to satisfy the performance requirement of the antenna.

With the improvement of high integration and miniaturization of the antenna, the spacing between adjacent radiating units needs to be greatly compressed.

Figure 1:
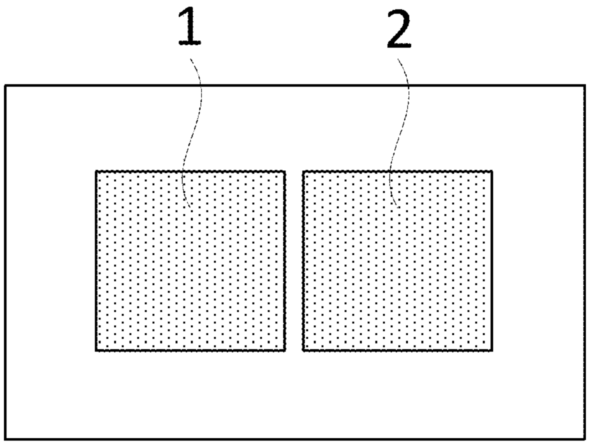
FIG. 1 is a schematic structural diagram of an antenna in the related art.
Figure 2:
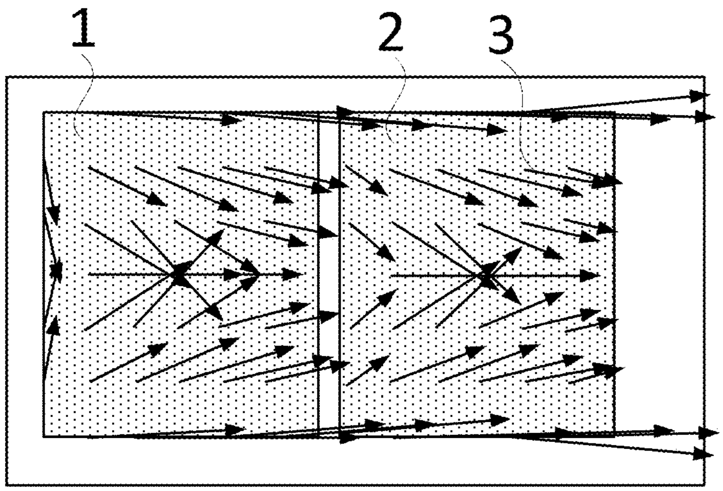
FIG. 2 is a schematic diagram of an electric field distribution of an antenna of FIG. 1.
Figure 3:
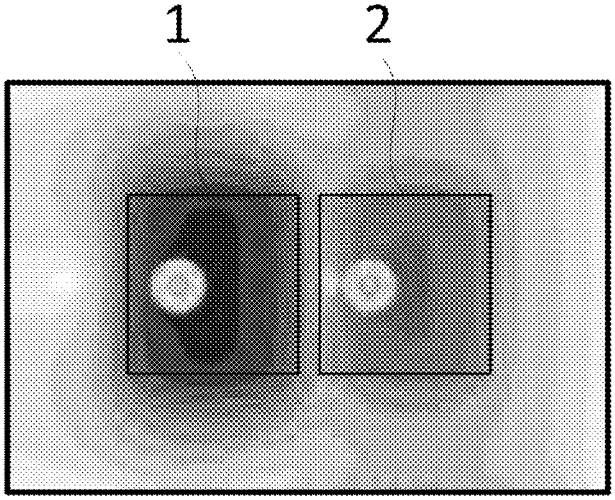
FIG. 3 is a schematic diagram of an electric field strength distribution of an antenna of FIG. 1.

FIG. 1 is a schematic structural diagram of an antenna in the related art, FIG. 2 is a schematic diagram of an electric field distribution of an antenna of FIG. 1, and FIG. 3 is a schematic diagram of an electric field strength distribution of an antenna of FIG. 1.

As shown in FIG. 1, the antenna includes a radiating unit 1 and a radiating unit 2 disposed adjacent to each other.

The inventors have found that in case that a spacing between the radiating unit 1 and the radiating unit 2 becomes less than 0.5$\lambda$, when the radiating unit 1 is operated and the radiating unit 2 is not operated, that is, when only the radiating unit 1 is fed, the radiating unit 1 radiates a radio frequency signal outwardly. At this time, an electric field formed by the antenna may be represented by the distribution of an electric field line 3 in FIG. 2, and the distribution of an electric field intensity may be represented by the grayscale distribution in FIG. 3. In FIG. 3, the stronger the electric field intensity, the deeper the grayscale color.

As can be seen from the distribution of the electric field line 3 in FIG. 2 and the distribution of the electric field intensity in FIG. 3, when a distance between the radiating unit 1 and the radiating unit 2 is less than 0.5λ, a coupled electric field with greater intensity may be formed on the radiating unit 2 when the radiating unit 1 is fed. Similarly, when the radiating unit 2 is fed, a coupled electric field with greater intensity may also be formed on the radiating unit 1. The mutual coupling between radiating units may have many negative effects on the performance of the antenna having the multiple radiating units, such as radiation pattern distortion, radiation performance deterioration, input impedance and radiation impedance change, and antenna radiation efficiency reduction. Therefore, the improvement of the isolation between radiating units is an urgent problem to be solved for the antenna with the high integration.

Figure 4:
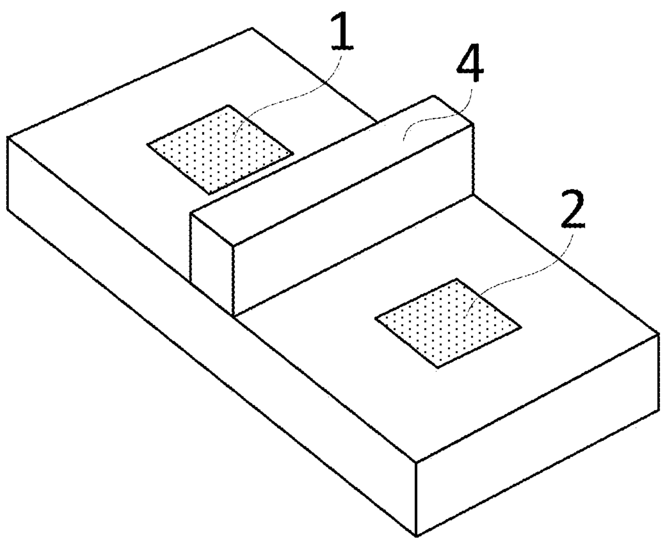
FIG. 4 is a schematic structural diagram of another antenna in the related art.

FIG. 4 is a schematic structural diagram of another antenna in the related art. As shown in FIG. 4, the inventors have further found that, in order to reduce the mutual coupling effect between the radiating unit 1 and the radiating unit 2 and to improve the isolation between the radiating unit 1 and the radiating unit 2, a vertical retaining wall 4 may be inserted between the radiating unit 1 and the radiating unit 2. However, the vertical barrier 4 needs to occupy a large space between the radiating unit 1 and the radiating unit 2, which is unfavorable to the high integration of the antenna and the miniaturization design of the antenna. Moreover, the vertical retaining wall 4 is also difficult in the manufacturing process and the packaging process.

Based on the above-described technical problem, an embodiment of the present disclosure provides an antenna. The antenna includes a first substrate, multiple radiating units and at least one decoupling structure. The multiple radiating units are arranged in an array on a side of the first substrate. At least two adjacent radiating units among the multiple radiating units constitute one radiating unit group, and the radiating unit group includes a first radiating unit and a second radiating unit disposed adjacent to each other. The at least one decoupling structure is disposed in correspondence with the radiating unit group, one decoupling structure of the at least one decoupling structure includes two microstrip line units, and one microstrip line unit of the two microstrip line units includes at least one microstrip line. The first radiating unit and the second radiating unit are disposed on a same layer and arranged in a first direction. In a second direction, the two microstrip line units are located on two opposite sides of the radiating unit group, respectively, and a vertical projection of one microstrip line unit of the two microstrip line units on the first substrate and a vertical projection of other microstrip line unit of the two microstrip line units on the first substrate are symmetrically disposed about a center point of a vertical projection of the radiating unit group on the first substrate. The second direction intersects the first direction.

According to the above-described technical schemes, when any one of the radiating units is in operation, a parasitic electric field may be formed on the decoupling structure, and the parasitic electric field may be coupled on another radiating unit to form a compensation electric field, so as to counteract the coupled electric field formed by the coupling of the operating radiating units on the radiating units, thereby reducing the mutual coupling between adjacent radiating units, improving the isolation between adjacent radiating units, and further solving a problem that the antenna in which the radiating units are closely placed may have strong mutual coupling between adjacent radiating units, which is conductive to improving the integration of the antenna. Moreover, the parasitic electric field on the decoupling structure also couples to the operating radiating units so as to form a positive electric field enhancement, thereby enhancing the primary electric field on the operating radiating units and improving the radiation efficiency of the antenna. In addition, the decoupling structure is composed of the microstrip line, is simple in structure, may be prepared directly by using the mature panel process, and is easy to implement.

The above is the core idea of the present disclosure, and the technical schemes of the embodiments of the present disclosure will be described clearly and completely in connection with the accompanying drawings in the embodiments of the present disclosure below.

Figure 5:
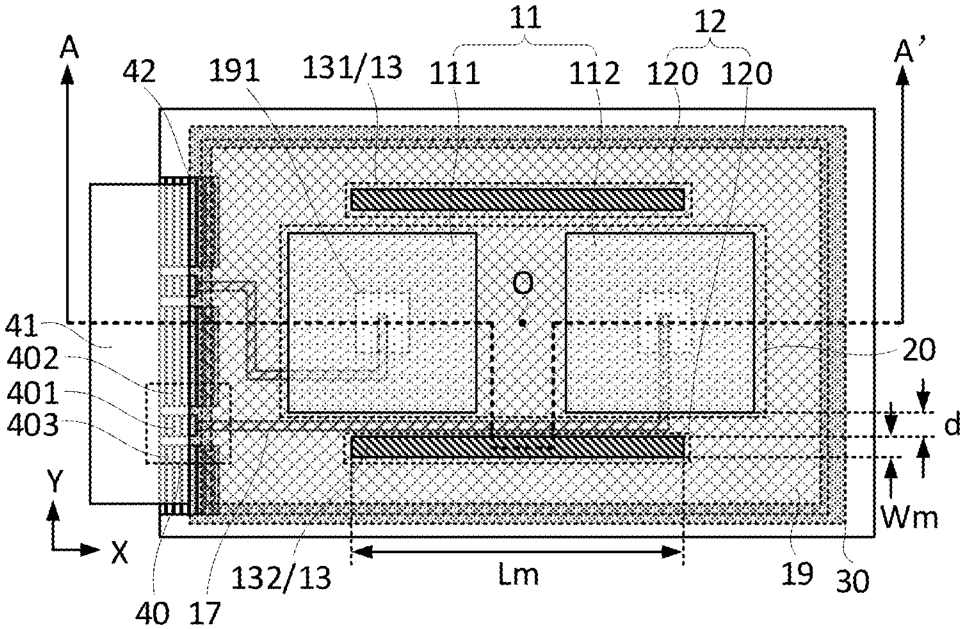
FIG. 5 is a schematic structural diagram of an antenna according to an embodiment of the present disclosure.
Figure 6:
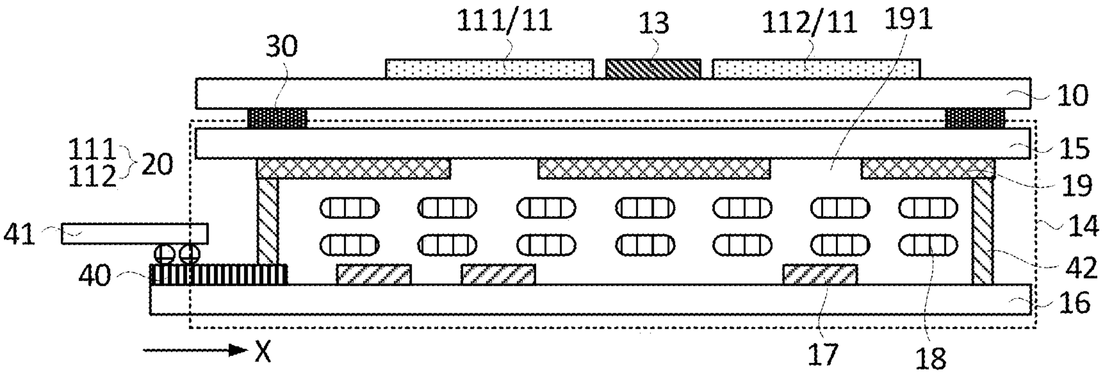
FIG. 6 is a schematic cross-sectional structural diagram of FIG. 5 taken along a direction of A-A'.

FIG. 5 is a schematic structural diagram of an antenna according to an embodiment of the present disclosure. FIG. 6 is a schematic cross-sectional structural diagram of FIG. 5 taken along a direction of A-A'. As shown in FIGS. 5 and 6, the antenna provided in the embodiments of the present disclosure includes a first substrate 10, multiple radiating units 11 and at least one decoupling structure 12. The multiple radiating units 11 are arranged in an array on a side of the first substrate 10. At least two adjacent radiating units 11 constitute one radiating unit group 20, and the radiating unit group includes a first radiating unit 111 and a second radiating unit 112 disposed adjacent to each other. The decoupling structure 12 is disposed in correspondence with the radiating unit group 20, and the decoupling structure 12 includes two microstrip line units 120, and one microstrip line unit of the two microstrip line units 120 includes at least one microstrip line 13. The first radiating unit 111 and the second radiating unit 112 are disposed on a same layer and arranged in a first direction X. In a second direction Y, the two microstrip line units 120 are located on two opposite sides of the radiating unit group 20, respectively, and a vertical projection of one microstrip line unit 20 in the two microstrip line units 120 on the first substrate 10 and a vertical projection of another microstrip line unit 20 in the two microstrip line units 120 on the first substrate 10 are symmetrically disposed about a center point O of a vertical projection of the radiating unit group 20 on the first substrate 10. The second direction Y intersects the first direction X.

Specifically, as shown in FIGS. 5 and 6, the radiating unit 11 is used for transmitting and receiving a signal, and the first substrate 10 is configured to support the radiating unit 11. The first substrate 10 is provided with at least two radiating units 11, and the at least two radiating units 11 may be located on a same film layer and arranged in an array.

When the antenna is in operation, different signals may be transmitted to different radiating units 11, respectively, so as to enable the multiple radiating units 11 to transmit and receive signals independently. For example, signals of different frequencies may be transmitted to different radiating units 11, respectively, so as to enable the multi-band communication. The different radiating units 11 may operate individually, simultaneously, or alternately to satisfy various functional requirements of the antenna, which is not specifically limited in the embodiments of the present disclosure.

Further, the first substrate 10 may be made of a material having a smaller dielectric constant (Dk) and a smaller dissipation factor (DF). The smaller the dielectric constant of the first substrate 10 is, the smaller the dissipation factor of the first substrate 10 to the radio frequency signal is. Similarly, the smaller the dissipation factor of the first substrate 10 is, the smaller the dissipation factor caused by the first substrate 10 on the radio frequency signal is. For example, the dielectric constant of the first substrate 10 may satisfy Dk≤5, and the dissipation factor may satisfy DF≤0.07, so that the first substrate 10 causes a small dissipation factor for the radio frequency signal, thereby being conductive to improving the radiation efficiency of the antenna.

Based on the above requirements for the dielectric constant of the first substrate 10 and the dissipation factor of the first substrate 10, the first substrate 10 may be selected from a glass substrate or a printed circuit board (PCB), so that the antenna has the relatively high radiation efficiency.

Further, the thinner a thickness of the first substrate 10 is, the smaller the dissipation factor of the radio frequency signal on the first substrate 10 is. In this embodiment, the thickness h of the first substrate 10 may be set to satisfy 0.3 mm≤h≤1.1 mm. The use of the thinner first substrate 10 can reduce the dissipation factor of the radio frequency signal and improve the radiation efficiency of the antenna. It should be understood that within the above thickness range, a smaller dissipation factor may be obtained by selecting the first substrate 10 of 0.3 mm. If the first substrate 10 is further thinned, then the first substrate 10 is liable to be damaged, which is detrimental to the support performance of the first substrate 10.

Further, any two adjacent radiating units 11 may constitute one radiating unit group 20. For example, as shown in FIGS. 5 and 6, the radiating unit group 20 includes the first radiating unit 111 and the second radiating unit 112 disposed adjacent to each other.

As described above, when a distance between the first radiating unit 111 and the second radiating unit 112 is small, the first radiating unit 111 and the second radiating unit 112 are coupled to each other to cause problems such as radiation pattern distortion, radiation performance deterioration, input impedance and radiation impedance change, and antenna radiation efficiency reduction.

Figure 7:
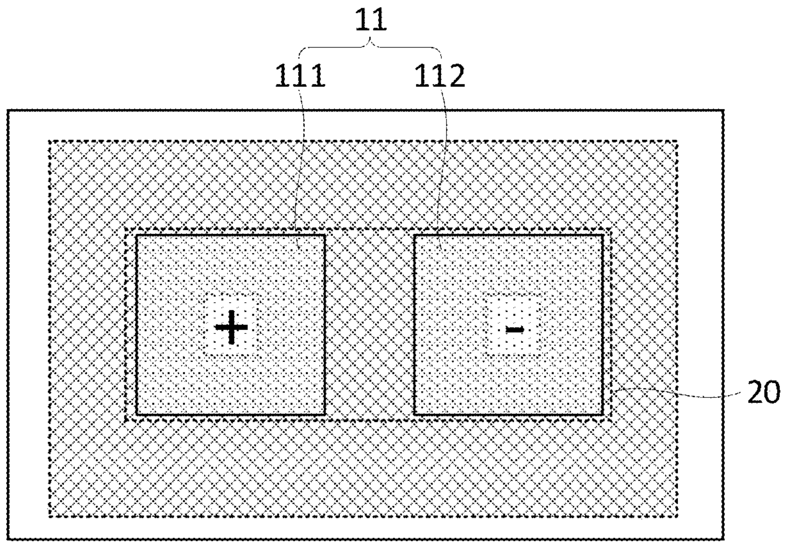
FIG. 7 is a schematic diagram of a mutual coupled electric field of an antenna in the related art.

Specifically, FIG. 7 is a schematic diagram of a mutual coupled electric field of an antenna in the related art. As shown in FIG. 7, when the first radiating unit 111 and the second radiating unit 112 are not correspondingly provided with the decoupling structure, there exist only direct coupling fields formed by the coupling between the first radiating unit 111 and the second radiating unit 112, and no other coupling field exists. For example, when only the first radiating unit 111 is fed, the coupled electric field directly generated by the first radiating unit 111 on the second radiating unit 112 is the direct coupling field.

A direction of a current induced by the direct coupling field to the first radiating unit 111 is opposite to a direction of a current induced by the direct coupling field to the second radiating unit 112. Therefore, the coupling causes a polarity inversion of the electric field. As shown in FIG. 7, if a positive electric field is applied to the first radiating unit 111, then a negative electric field may be coupled to the second radiating unit 112, and the negative electric field may affect the radiation performance of the second radiating unit 112.

With continued reference to FIGS. 5 and 6, in this embodiment, at least one radiating unit group 20 is correspondingly provided with a respective decoupling structure 12. The decoupling structure 12 includes two microstrip line units 120, one microstrip line unit of the two microstrip line units 120 consists of at least one microstrip line 13. Moreover, if an arrangement direction of the first radiating unit 111 and the second radiating unit 112 is the first direction X, then in the second direction Y intersecting the first direction X, the two microstrip line units 120 are respectively located on two opposite sides of the radiating unit group 20, that is, an arrangement direction of the two microstrip line units 120 intersects the arrangement direction of the first radiating unit 111 and the second radiating unit 112. FIGS. 5 and 6 show an example in which the first direction X is perpendicular to the second direction Y.

Figure 8:
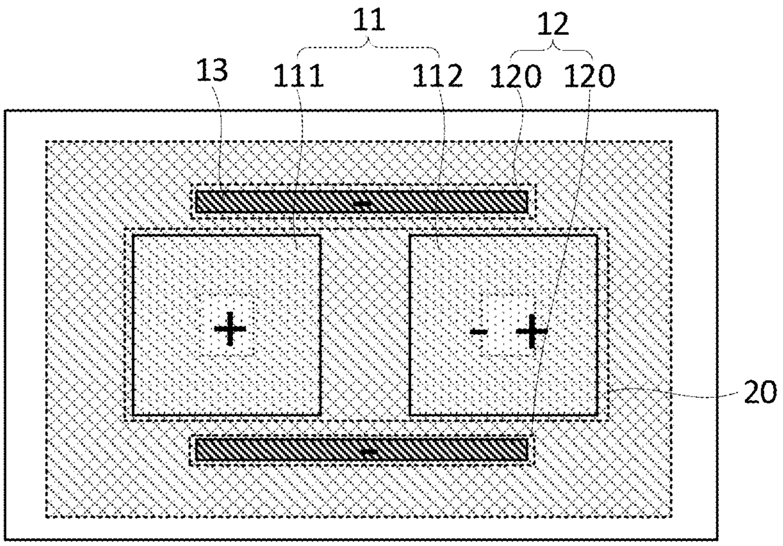
FIG. 8 is a schematic diagram of a mutual coupled electric field of an antenna according to an embodiment of the present disclosure.

FIG. 8 is a schematic diagram of a mutual coupled electric field of an antenna according to an embodiment of the present disclosure. As shown in FIG. 8, the decoupling structure 12 is provided for the radiating unit group 20, an indirect coupling field is formed on the first radiating unit 111 and the second radiating unit 112 in addition to the above-described direct coupling field. For example, when only the first radiating unit 111 is fed, the coupled electric field indirectly generated on the second radiating unit 112 by the first radiating unit 111 through the decoupling structure 12 is the indirect coupling field.

As such, in addition to the direct coupling field having an effect on the induced currents on the first radiating unit 111 and the second radiating unit 112, the indirect coupling field also has an effect on the induced currents on the first radiating unit 111 and the second radiating unit 112. Therefore, the induced currents on the first radiating unit 111 and the second radiating unit 112 may be considered to be a superposition of currents generated by the direct coupling field and the indirect coupling field.

Specifically, with continued reference to FIG. 8, as previously described, if a positive electric field is applied to the first radiating unit 111, then the first radiating unit 111 may be directly coupled to the second radiating unit 112 to form a negative electric field, and this negative electric field may affect the radiation performance of the second radiating unit 112. Moreover, the first radiating unit 111 is coupled to the microstrip line 13 in the two microstrip line units 120 to form the parasitic electric field. Since the polarity inversion is formed by the coupling, if the first radiating unit 111 is the positive electric field, then the parasitic electric field formed by coupling on the microstrip line 13 is the negative electric field.

Further, as shown in FIG. 8, the negative electric field on the microstrip line 13 is coupled to the second radiating unit 112 to form a compensation electric field, since the polarity inversion is formed by the coupling, the compensation electric field is the positive electric field, the positive electric field compensates for the negative electric field formed by the directly coupling of the first radiating unit 111 to the second radiating unit 112 so as to counteract at least a part of the negative electric field formed by the directly coupling of the first radiating unit 111 to the second radiating unit 112, thereby reducing the mutual coupling between the first radiating unit 111 and the second radiating unit 112, improving the isolation between the first radiating unit 111 and the second radiating unit 112, and further solving a problem that the antenna in which the radiating units 11 are closely placed may have strong mutual coupling between adjacent radiating units 11, which is conductive to improving the integration of the antenna.

Moreover, as shown in FIG. 8, the negative electric field formed by the coupling of the first radiating unit 111 on the microstrip lines 13 in the two microstrip line units 120 is also negatively fed back to the first radiating unit 111, and a feedback enhancement electric field is formed in the coupling of the first radiating unit 111. Since the polarity inversion is formed by the coupling, the feedback enhancement electric field is the positive electric field, thereby forming a positive electric field enhancement on the first radiating unit 111, which can enhance a primary electric field on the first radiating unit 111 and improve the radiation efficiency of the first radiating unit 111.

Further, with continued reference to FIG. 5, a vertical projection of one microstrip line unit of the two microstrip line units 120 on the first substrate 10 and a vertical projection of other microstrip line unit of the two microstrip line units 120 on the first substrate 10 are symmetrically disposed about the center point O of the vertical projection of the radiating unit group 20 on the first substrate 10, so that parasitic electric fields formed on the two microstrip line units 120 contribute symmetrical electric field compensations to the first radiating unit 111 and the second radiating unit 112, thereby avoiding the introduction of new additional coupled electric fields which is detrimental to the decoupling effect of the decoupling structure 12.

The center point O of the vertical projection of the radiating unit group 20 on the first substrate 10 is a geometric center of the vertical projection of the radiating unit group 20 on the first substrate 10. As shown in FIG. 5, that the vertical projection of the one microstrip line unit of the two microstrip line units 120 on the first substrate 10 and the vertical projection of the other microstrip line unit of the two microstrip line units 120 on the first substrate 10 are symmetrically disposed about the center point O of the vertical projection of the radiating unit group 20 on the first substrate 10 may be: a straight line passing through a center point O and extending in first direction X is used as a first symmetry axis, the vertical projection of the one microstrip unit of the two microstrip units 120 on first substrate 10 and the vertical projection of the another microstrip unit of the two microstrip line units 120 on the first substrate 10 are symmetrically disposed about the first symmetry axis, and moreover, a straight line passing through the center point O and extending in the second direction Y is used as a second symmetry axis, a vertical projection of each microstrip line unit 120 on the first substrate 10 is symmetrical about the second symmetry axis, with such arrangement, the parasitic electric fields formed on the two microstrip units 120 contribute symmetrical electric field compensations to the first radiating unit 111 and the second radiating unit 112, thereby avoiding the introduction of new additional coupled electric fields which is detrimental to the decoupling effect of the decoupling structure 12.

Figure 9:
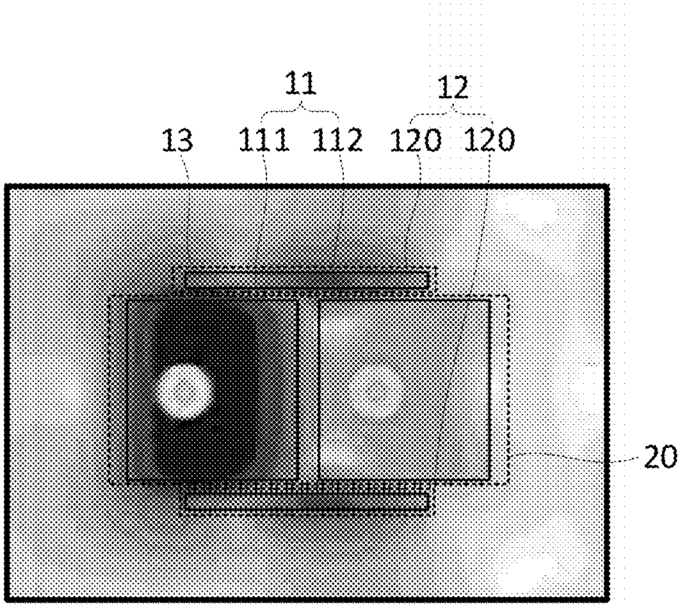
FIG. 9 is a schematic diagram of an electric field strength distribution of an antenna according to an embodiment of the present disclosure.

FIG. 9 is a schematic diagram of an electric field strength distribution of an antenna according to an embodiment of the present disclosure. In FIG. 9, a darker gray color indicates a stronger electric field intensity.

As shown in FIG. 9, when the distance between the first radiating unit 111 and the second radiating unit 112 is less than 0.5λ, the decoupling structure 12 is provided. In case that the first radiating unit 111 is operated and the second radiating unit 112 is not operated, that is, only the first radiating unit 111 is fed, the first radiating unit 111 is coupled to the microstrip line 13 in the two microstrip line units 120 to form the parasitic electric field, and the parasitic electric field on the microstrip line 13 is coupled to the second radiating unit 112 to form the compensation electric field, so as to counteract at least a part of the coupled electric field formed by the directly coupling of the first radiating unit 111 to the second radiating unit 112. As can be seen from FIG. 3, the intensity of the coupled electric field formed on the second radiating unit 112 is greatly reduced, thereby reducing the mutual coupling between the first radiating unit 111 and the second radiating unit 112, improving the isolation between the first radiating unit 111 and the second radiating unit 112, and further solving the problem that the antenna in which the radiating units 11 are closely placed may have strong mutual coupling between adjacent radiating units 11, which is conductive to improving the integration of the antenna.

Moreover, with continued reference to FIG. 9, the parasitic electric field formed by coupling the first radiating unit 111 on the microstrip line 13 in the two microstrip line units 120 is also negatively fed back to the first radiating unit 111, and a feedback enhancement electric field is formed by coupling the first radiating unit 111, thereby achieving an electric field enhancement by coupling the first radiating unit 111. As can be seen from FIG. 3, the primary electric field on the first radiating unit 111 is enhanced, thereby being conductive to improving the radiation efficiency of the first radiating unit 111.

It should be noted that the length and width of the microstrip line 13 in the microstrip line unit 120 and the spacing between the microstrip line 13 and the corresponding radiating unit 11 may be optimized for the operating frequency of the antenna, the impedance matching requirement, and the requirements of the radiation performance and loss.

Here, as shown in FIG. 5, a length Lm of the microstrip line 13, a width Wm of the microstrip line 13 and a spacing d between the microstrip line 13 and the adjacent radiating unit 11 can be adjusted so that the influence of the electric field generated by the operating radiating unit 11 on the electric field of the adjacent radiating unit 11 can be minimized.

Specifically, for the length Lm of the microstrip line 13, the inventors have found that the length Lm of the microstrip line 13 is related to the operating frequency of the antenna, and the length Lm of the microstrip line 13 may be set to be on the same order of magnitude as the operating wavelength of the antenna, so as to achieve the better antenna radiation performance. For example, if the decoupling structure 12 is applied to a millimeter-wave antenna, then the length Lm of the microstrip line 13 is on the order of millimeters; if the decoupling structure 12 is applied to a centimeter-wave antenna, then the length Lm of the microstrip line 13 is on the order of centimeters.

Moreover, the length Lm of the microstrip line 13 is also related to the optimum decoupling frequency range, the optimum decoupling frequency range of the decoupling structure 12 moves to a high frequency as the length Lm of the microstrip line 13 becomes shorter, and the decoupling effect of the decoupling structure 12 is better. Therefore, if it is necessary to reduce the mutual coupling effect of the high frequency range, the length Lm of the microstrip line 13 may be set relatively short; and if it is necessary to reduce the mutual coupling effect of the low frequency range, then the length Lm of the microstrip line 13 may be set relatively long.

For the width Wm of the microstrip line 13, the inventors have found that the width Wm of the microstrip line 13 is inversely proportional to the isolation, that is, the larger the width Wm of the microstrip line 13 is, the worse the isolation effect between the decoupling structure 12 and adjacent radiating units 11 is, and the smaller the width Wm of the microstrip line 13 is, the better the isolation effect between the decoupling structure 12 and adjacent radiating units 11 is.

Moreover, the width Wm of the microstrip line 13 is also related to the optimum decoupling frequency range. The larger the width Wm of the microstrip line 13 is, the optimum decoupling frequency range of the decoupling structure 12 moves toward the low frequency. The smaller the width Wm of the microstrip line 13 is, the optimum decoupling frequency range of the decoupling structure 12 moves toward the high frequency. Therefore, if it is necessary to reduce the mutual coupling effect of the high frequency range, the width Wm of the microstrip line 13 may be set to be relatively narrow. If it is necessary to reduce the mutual coupling effect of the low frequency range, the width Wm of the microstrip line 13 may be set to be relatively wide.

For the spacing d between the microstrip line 13 and the adjacent radiating unit 11, the inventors have found that the smaller the spacing d between the microstrip line 13 and the adjacent radiating unit 11 is, the better the decoupling effect of the decoupling structure 12 is.

Optionally, the spacing d between the microstrip line 13 and the adjacent radiating unit 11 may be set in the range of 3 μm to 10 μm. At this time, the field strength of the parasitic electric field formed by the coupling of the first radiating unit 111 on the microstrip line 13 is sufficient to counteract the coupled electric field formed by the coupling of the first radiating unit 111 on the second radiating unit 112, so that the decoupling structure 12 achieves the optimal decoupling effect.

Optionally, the spacing d between the microstrip line 13 and the adjacent radiating unit 11 is not limited to the above-described range. In view of the ease of the manufacturing process, the spacing d between the microstrip line 13 and the adjacent radiating unit 11 can be set larger. For example, the spacing d between the microstrip line 13 and the adjacent radiating unit 11 may be set in the range of 8 μm to 20 μm, so as to reduce the difficulty of the manufacturing process of the antenna and achieve the better decoupling effect of the decoupling structure 12.

It can be understood from the above description that the isolation effect of the decoupling structure 12 may be adjusted by adjusting the length Lm and the width Wm of the microstrip line 13 and the spacing d between the microstrip line 13 and the adjacent radiating unit 11 in a coordinated manner. Since the large setting of the width Wm of the microstrip line 13 can be detrimental to the improvement of the isolation, the required decoupling frequency range can be acquired mainly by adjusting the length Lm of the microstrip line 13. Moreover, the field strength of the parasitic electric field formed on the microstrip line 13 can be roughly adjusted by adjusting the length Lm of the microstrip line 13 and the spacing d between the microstrip line 13 and the adjacent radiating unit 11, further, the field strength of the parasitic electric field formed on the microstrip line 13 is finely adjusted by adjusting the width Wm of the microstrip line 13, so that the field strength of the parasitic electric field formed on the microstrip line 13 by the coupling of the first radiating unit 111 on the microstrip line 13 is sufficient to counteract the coupled electric field formed on the second radiating unit 112 by the coupling of the first radiating unit 111 on the second radiating unit 112, whereby the decoupling structure 12 is enabled to achieve the good decoupling effect.

In this embodiment, the width Wm of the microstrip line 13 may be set in the range of a few microns to a few hundred microns. The width Wm of the microstrip line 13 being less than or equal to 100 μm may enable the isolation of the antenna to be increased by 10 dB or more without adversely affecting the radiation efficiency of the antenna. Therefore, the decoupling structure 12 just occupies a space less than hundred microns in width, and the spacing between adjacent radiating units 11 can be greatly reduced. An antenna with an operating wavelength of 6 GHz is used as an example, in case that the decoupling structure 12 is not provided, the spacing between adjacent radiating units 11 is required to be greater than or equal to 0.5λ (~25 mm) so as to ensure the isolation, and in case that the decoupling structure 12 is provided, the spacing between adjacent radiating units 11 can be reduced from ~25 mm to 1 mm-2 mm in a case of ensuring the isolation, thereby facilitating the high integration and the miniaturized design of the antenna.

Moreover, the decoupling structure 12 is composed of the microstrip line 13. The decoupling structure 12 is simple in structure, may be prepared directly by using the mature panel process, and is easy to implement.

In conclusion, according to the antenna provided in embodiments of the present disclosure, the decoupling structure composed of the microstrip line is disposed on two sides of at least two adjacent radiating units. When any one of the radiating units is in operation, a parasitic electric field may be formed on the decoupling structure, and the parasitic electric field may be coupled on another radiating unit to form a compensation electric field, so as to counteract the coupled electric field formed by the direct coupling of the operating radiating units on the another radiating unit, thereby reducing the mutual coupling between adjacent radiating units, improving the isolation between adjacent radiating units, and further solving a problem that the antenna in which the radiating units are closely placed may have strong mutual coupling between adjacent radiating units, which is conductive to improving the integration of the antenna. Moreover, the parasitic electric field on the decoupling structure also couples to the operating radiating units so as to form a positive electric field enhancement, thereby enhancing the primary electric field on the operating radiating units and improving the radiation efficiency of the antenna. In addition, the decoupling structure is composed of the microstrip line, is simple in structure, may be prepared directly by using the mature panel process, and is easy to implement.

With continued reference to FIGS. 5 and 6, optionally, the one microstrip line unit of the two microstrip line units 120 includes a first microstrip line 131, and the other microstrip line unit of the two microstrip line units 120 includes a second microstrip line 132. The first microstrip line 131 and the second microstrip line 132 each extend in the arrangement direction of the first radiating unit 111 and the second radiating unit 112. A vertical projection of the first microstrip line 131 on the first substrate 10 and a vertical projection of the second microstrip line 132 on the first substrate 10 are symmetrically disposed about the center point O of the vertical projection of the radiating unit group 20 on the first substrate 10.

Specifically, as shown in FIGS. 5 and 6, in the two microstrip line units 120 of the decoupling structure 12, one microstrip line unit 120 is composed of the first microstrip line 131, and the other microstrip line unit 120 is composed of the second microstrip line 132, that is, the decoupling structure 12 is composed of only the two microstrip lines 13, i.e., the first microstrip line 131 and the second microstrip line 132. The structure is simple, and the preparation process is easy to be implemented.

Further, as shown in FIG. 5, the first microstrip line 131 and the second microstrip line 132 each extend in the arrangement direction of the first radiating unit 111 and the second radiating unit 112 (the first direction X in the drawings), and the first microstrip line 131 and the second microstrip line 132 are arranged in a direction intersecting the arrangement direction of the first radiating unit 111 and the second radiating unit 112 (the second direction Y in the drawings). The first microstrip line 131 and the second microstrip line 132 are respectively located on two opposite sides of the radiating unit group 20, and the vertical projection of the first microstrip line 131 on the first substrate 10 and the vertical projection of the second microstrip line 132 on the first substrate 10 are symmetrically disposed about the center point O of the vertical projections of the radiating unit group 20 on the first substrate 10.

Exemplarily, as shown in FIG. 5, the straight line passing through the center point O and extending in first direction X is used as the first symmetry axis, the vertical projection of the first microstrip line 131 on the first substrate 10 and the vertical projection of the second microstrip line 132 on the first substrate 10 are symmetrically disposed about the first symmetry axis, and moreover, the straight line passing through the center point O and extending in the second direction Y is used as the second symmetry axis, a vertical projection of the first microstrip line 131 on the first substrate 10 is symmetrical about the second symmetry axis, and a vertical projection of the second microstrip line 132 on the first substrate 10 is symmetrical about the second symmetry axis.

With such arrangement, when the first radiating unit 111 is fed, the first radiating unit 111 is coupled to the first microstrip line 131 and the second microstrip line 132 to form parasitic electric fields, the parasitic electric fields on the first microstrip line 131 and the second microstrip line 132 are coupled to the second radiating unit 112 to form the compensation electric field, so as to counteract at least a part of the coupled electric field formed by the directly coupling of the first radiating unit 111 to the second radiating unit 112. Similarly, when the second radiating unit 112 is fed, the second radiating unit 112 is coupled to the first microstrip line 131 and the second microstrip line 132 to form parasitic electric fields, the parasitic electric fields on the first microstrip line 131 and the second microstrip line 132 are coupled to the first radiating unit 111 to counteract at least a part of the coupled electric field formed by direct coupling of the second radiating unit 112 to the first radiating unit 111. As a result, the first microstrip line 131 and the second microstrip line 132 are provided so that the mutual coupling between the first radiating unit 111 and the second radiating unit 112 is reduced, the isolation between the first radiating unit 111 and the second radiating unit 112 is improved, thereby solving the problem that the antenna in which the radiating units 11 are closely placed may have strong mutual coupling between adjacent radiating units 11, which is conductive to improving the integration of the antenna.

Moreover, the parasitic electric field formed on the first microstrip line 131 and the second microstrip line 132 is also negatively fed back to the feeding radiating unit 11, and a feedback enhancement electric field is formed by coupling the operating radiating unit 11, thereby forming a positive electric field enhancement on the feeding radiating unit 11, which is conductive to improving the radiation efficiency of the antenna.

It should be noted that a length of the first microstrip line 131 and a length of the second microstrip line 132 may be optimized for the operation frequency of the antenna, impedance matching requirements, and radiation performances and loss requirements, so as to minimize the mutual coupling effect between adjacent radiating units 11.

The inventors have found that, in the second direction Y, the first microstrip line 131 at least partially overlaps with the first radiating unit 111, and the first microstrip line 131 at least partially overlaps with the second radiating unit 112. Similarly, in the second direction Y, the second microstrip line 132 at least partially overlaps with the first radiating unit 111, and the second microstrip line 132 at least partially overlaps with the second radiating unit 112, so that the decoupling structure 12 can achieve the better decoupling effect.

Further, in the first direction X, the length of the first microstrip line 131 is less than or equal to the sum of the length of the first radiating unit 111 and the length of the second radiating unit 112. Similarly, the length of the second microstrip line 132 is less than or equal to the sum of the length of the first radiating unit 111 and the length of the second radiating unit 112, so that the decoupling structure 12 can achieve the better decoupling effect.

Figure 10:
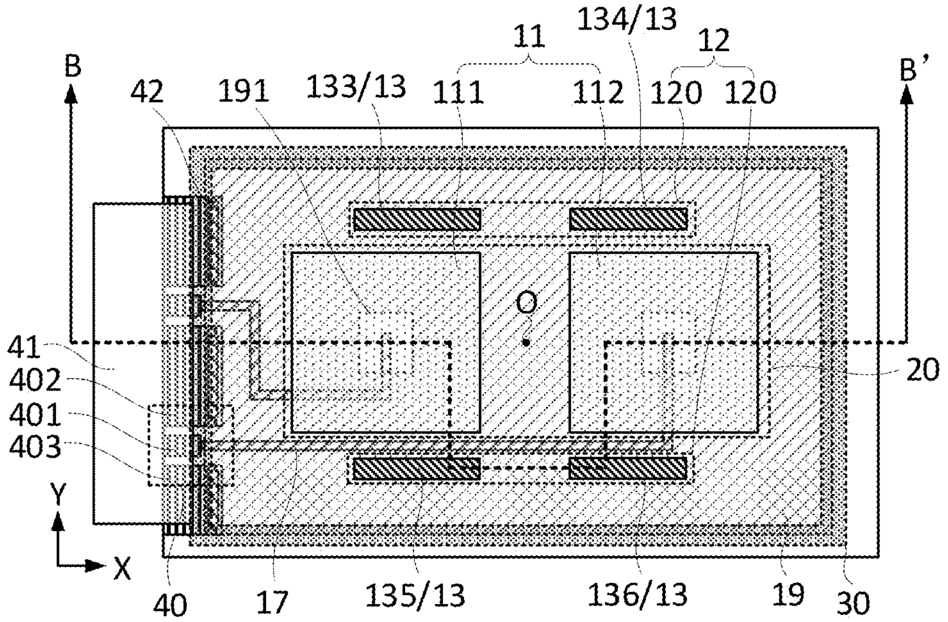
FIG. 10 is a schematic structural diagram of another antenna according to an embodiment of the present disclosure.
Figure 11:
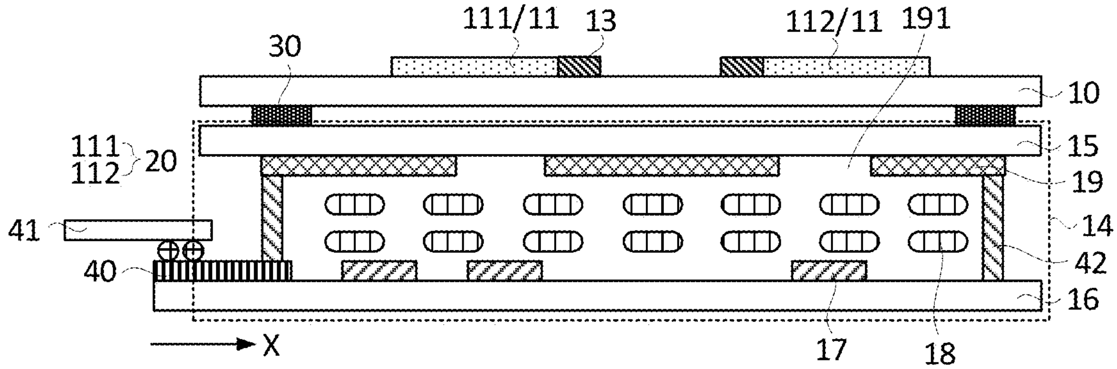
FIG. 11 is a schematic cross-sectional structural diagram of FIG. 10 taken along a direction of B-B'.

FIG. 10 is a schematic structural diagram of another antenna according to an embodiment of the present disclosure, and FIG. 11 is a schematic cross-sectional structural diagram of FIG. 10 taken along a direction of B-B'. As shown in FIGS. 10 and 11, optionally, one microstrip line unit of the two microstrip line units 120 includes a third microstrip line 133 and a fourth microstrip line 134 arranged in the first direction X, and the third microstrip line 133 and the fourth microstrip line 134 are insulated from each other. The other microstrip line unit 120 of the two microstrip line units 120 includes a fifth microstrip line 135 and a sixth microstrip line 136 arranged in the first direction, and the fifth microstrip line 135 and the sixth microstrip line 136 are insulated from each other. The third microstrip line 133, the fourth microstrip line 134, the fifth microstrip line 135 and the sixth microstrip line 136 extend in the first direction X. The third microstrip line 133 and the fifth microstrip line 135 at least partially overlap with the first radiating unit 111 in the second direction Y, and the fourth microstrip line 134 and the sixth microstrip line 136 at least partially overlap with the second radiating unit 112 in the second direction Y.

Specifically, as shown in FIGS. 10 and 11, in the two microstrip line units 120 of the decoupling structure 12, one microstrip line unit 120 is composed of a third microstrip line 133 and a fourth microstrip line 134 which are insulated from each other, and the other microstrip line unit 120 is composed of a fifth microstrip line 135 and a sixth microstrip line 136 which are insulated from each other, that is, the decoupling structure 12 is composed of four microstrip lines 13, namely, the third microstrip line 133, the fourth microstrip line 134, the fifth microstrip line 135 and the sixth microstrip line 136.

Further, as shown in FIG. 10, the third microstrip line 133, the fourth microstrip line 134, the fifth microstrip line 135 and the sixth microstrip line 136 each extend in the arrangement direction of the first radiating unit 111 and the second radiating unit 112 (the first direction X in the drawings), and the third microstrip line 133 and the fifth microstrip line 135 are arranged in a direction intersecting the arrangement direction of the first radiating unit 111 and the second radiating unit 112 (the second direction Y in the drawings), and the fourth microstrip line 134 and the sixth microstrip line 136 are arranged in a direction intersecting the arrangement direction of the first radiating unit 111 and the second radiating unit 112 (the second direction Y in the drawings). The third microstrip line 133 and the fifth microstrip line 135 may be located on two opposite sides of the first radiating unit 111, the fourth microstrip line 134 and the sixth microstrip line 136 may be located on two opposite sides of the second radiating unit 112, respectively, and a vertical projection of the third microstrip line 133 on the first substrate 10, a vertical projection of the fourth microstrip line 134 on the first substrate 10, a vertical projection of the fifth microstrip line 135 on the first substrate 10, and a vertical projection of the sixth microstrip line 136 on the first substrate 10 are symmetrically disposed about the center point O of the vertical projection of the radiating unit group 20 on the first substrate 10.

Exemplarily, as shown in FIG. 10, the straight line passing through the center point O and extending in first direction X is used as the first symmetry axis, a vertical projection of the third microstrip line 133 on the first substrate 10 and a vertical projection of the fifth microstrip line 135 on the first substrate 10 are symmetrically disposed about the first symmetry axis, and a vertical projection of the fourth microstrip line 134 on the first substrate 10 and a vertical projection of the sixth microstrip line 136 on the first substrate 10 are symmetrically disposed about the first symmetry axis, and moreover, the straight line passing through the center point O and extending in the second direction Y is used as the second symmetry axis, a vertical projection of the third microstrip line 133 on the first substrate 10 and a vertical projection of the fourth microstrip line 134 on the first substrate 10 are symmetrical about the second symmetry axis, and a vertical projection of the fifth microstrip line 135 on the first substrate 10 and a vertical projection of the sixth microstrip line 136 on the first substrate 10 are symmetrical about the second symmetry axis.

Figure 12:
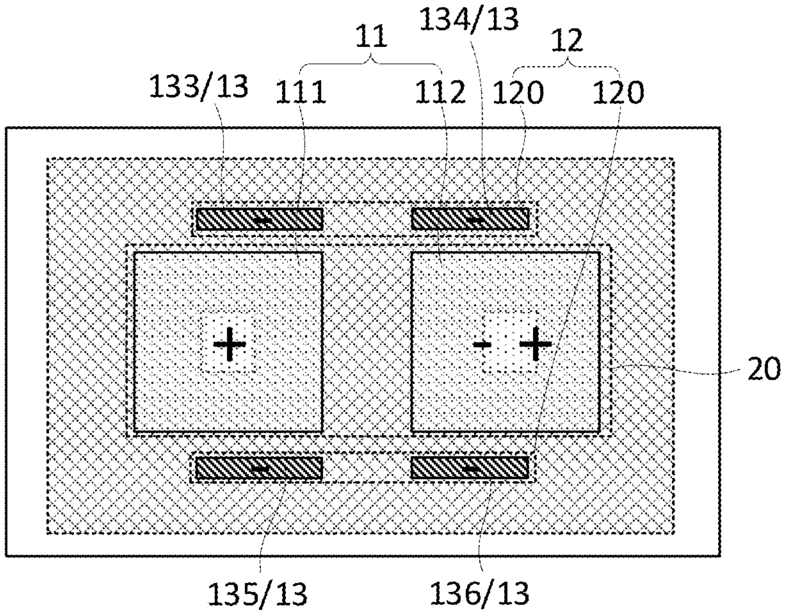
FIG. 12 is a schematic diagram of a mutual coupled electric field of another antenna according to an embodiment of the present disclosure.

FIG. 12 is a schematic diagram of a mutual coupled electric field of another antenna according to an embodiment of the present disclosure. As shown in FIG. 12, in this embodiment, when the first radiating unit 111 is fed, a primary electric field is formed on the first radiating unit 111 (for example, the primary electric field in FIG. 12 is a positive electric field), and the first radiating unit 111 is coupled on the third microstrip line 133, the fourth microstrip line 134, the fifth microstrip line 135 and the sixth microstrip line 136 to form parasitic electric fields (for example, the parasitic electric fields in FIG. 12 are the negative electric fields).

The electric field strength on the microstrip line 13 is concentrated at a position close to the middle of the microstrip line 13. Therefore, in the second direction Y, the fourth microstrip line 134 and the sixth microstrip line 136 are set to at least partially overlap with the second radiating unit 112, that is, the fourth microstrip line 134 and the sixth microstrip line 136 are located on two opposite sides of the second radiating unit 112, respectively, so that positions of the strongest strength of the parasitic electric fields on the fourth microstrip line 134 and the sixth microstrip line 136 are located on two opposite sides of the second radiating unit 112, respectively, and further parasitic electric fields on the fourth microstrip line 134 and the sixth microstrip line 136 may be coupled to the second radiating unit 112 to form a compensation electric field that is stronger and more symmetrical with respect to the center position of the second radiating unit 112 (for example, the compensation electric field in FIG. 12 is the positive electric field), thereby being able to better counteract the coupled electric field formed by the directly coupling of the first radiating unit 111 to the second radiating unit 112 (for example, the coupled electric field in FIG. 12 is the negative electric field). Similarly, when the second radiating unit 112 is fed, the second radiating unit 112 may be coupled on the third microstrip line 133, the fourth microstrip line 134, the fifth microstrip line 135 and the sixth microstrip line 136 to form parasitic electric fields, the third microstrip line 133 and the fifth microstrip line 135 are set to at least partially overlap with the first radiating unit 111 in the second direction Y, that is, the third microstrip line 133 and the fifth microstrip line 135 are located on two opposite sides of the first radiating unit 111, respectively, so that positions of the strongest strength of the parasitic electric fields on the third microstrip line 133 and the fifth microstrip line 135 are located on two opposite sides of the first radiating unit 111, and further parasitic electric fields on the third microstrip line 133 and the fifth microstrip line 135 may be coupled to the first radiating unit 111 to form a compensation electric field that is stronger and more symmetrical with respect to the center position of the first radiating unit 111, thereby being able to better counteract the coupled electric field formed by the directly coupling of the second radiating unit 112 to the first radiating unit 111

As a result, the third microstrip line 133, the fourth microstrip line 134, the fifth microstrip line 135 and the sixth microstrip line 136 are provided so that the mutual coupling between the first radiating unit 111 and the second radiating unit 112 is reduced, the isolation between the first radiating unit 111 and the second radiating unit 112 is improved, and thereby solving the problem that the antenna in which the radiating units 11 are closely placed may have strong mutual coupling between adjacent radiating units 11, which is conductive to improving the integration of the antenna.

Moreover, the third microstrip line 133 and the fifth microstrip line 135 at least partially overlap with the first radiating unit 111 in the second direction Y, that is, the third microstrip line 133 and the fifth microstrip line 135 are located on two opposite sides of the first radiating unit 111, respectively. When the first radiating unit 111 is fed, positions at which a strength of the parasitic electric fields on the third microstrip line 133 and the fifth microstrip line 135 is strongest are located on two opposite sides of the first radiating unit 111, and further parasitic electric fields on the third microstrip line 133 and the fifth microstrip line 135 may be coupled to the first radiating unit 111 to form a feedback enhancement electric field on the first radiating unit 111 that is stronger and more symmetrical with respect to the center position of the first radiating unit 111, thereby forming the better forward electric field enhancement to the first radiating unit 111, which is conductive to improving the radiation efficiency of the antenna.

Similarly, the fourth microstrip line 134 and the sixth microstrip line 136 are at least partially overlapped with the second radiating unit 112 in the second direction Y, that is, the fourth microstrip line 134 and the sixth microstrip line 136 are located on two opposite sides of the second radiating unit 112, respectively. When the second radiating unit 112 is fed, positions at which a strength of the parasitic electric fields on the fourth microstrip line 134 and the sixth microstrip line 136 is strongest are located on two opposite sides of the second radiating unit 112, and further parasitic electric fields on the fourth microstrip line 134 and the sixth microstrip line 136 may be coupled to the second radiating unit 112 to form a feedback enhancement electric field on the second radiating unit 112 that is stronger and more symmetrical with respect to the center position of the second radiating unit 112, thereby forming the better forward electric field enhancement to the second radiating unit 112, which is conductive to improving the radiation efficiency of the antenna.

Figure 13:
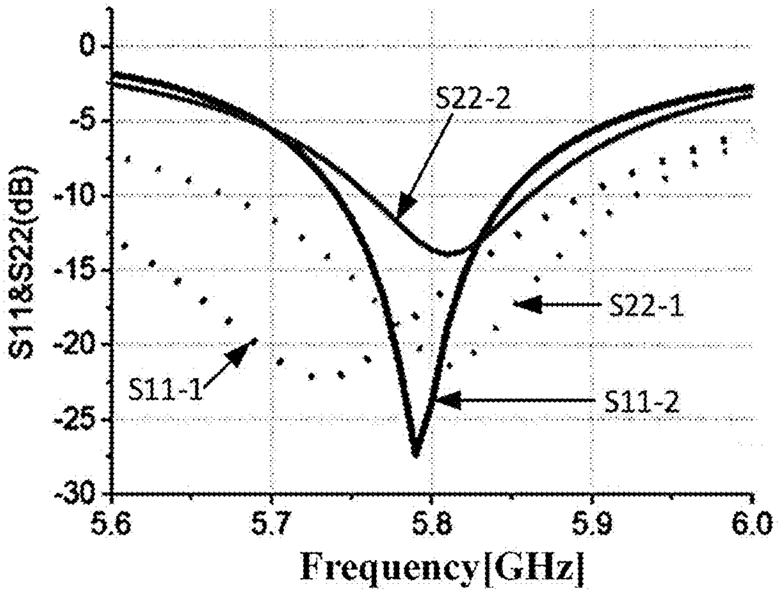
FIG. 13 is a schematic diagram of simulation results of an antenna according to an embodiment of the present disclosure.

FIG. 13 is a schematic diagram of simulation results of an antenna according to an embodiment of the present disclosure, an example in which the first radiating unit 111 is operated and the second radiating unit 112 is not operated, that is, only the first radiating unit 111 is fed is used as an example in FIG. 13 for description. A curve S11-1 represents that a return loss of the first radiating unit 111 in case that the decoupling structure 12 is not provided, a curve S22-1 represents that a return loss of the second radiating unit 112 in case that the decoupling structure 12 is not provided, a curve S11-2 represents that a return loss of the first radiating unit 111 in case that the decoupling structure 12 is provided, and the curve S22-2 represents that a return loss of the second radiating unit 112 in case that the decoupling structure 12 is provided.

As shown in FIGS. 10 to 13, in case that the decoupling structure 12 provided in the embodiments of the present disclosure is provided, the return loss of the first radiating unit 111 in an operating bandwidth range becomes smaller, which indicates that the radiation performance of the first radiating unit 111 is effectively improved. The return loss of the second radiating unit 112 in the operating bandwidth range becomes larger, which indicates that the influence of the electric field of the first radiating unit 111 on the second radiating unit 112 becomes smaller, and the isolation between the first radiating unit 111 and the second radiating unit 112 is effectively improved.

Figure 14:
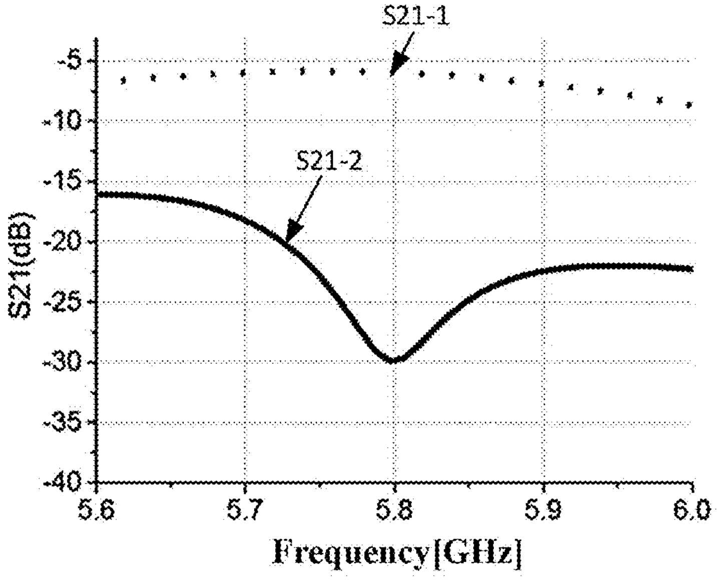
FIG. 14 is a schematic diagram of simulation results of another antenna according to an embodiment of the present disclosure.

FIG. 14 is a schematic diagram of simulation results of another antenna according to an embodiment of the present disclosure, an example in which the first radiating unit 111 is operated, and the second radiating unit 112 is not operated, that is, only the first radiating unit 111 is fed is used as an example in FIG. 14 for description. A curve S21-1 represents that an insertion loss of the first radiating unit 111 in case that the decoupling structure 12 is not provided, and a curve S21-2 represents that an insertion loss of the first radiating unit 111 in case that the decoupling structure 12 is provided. As shown in FIGS. 10 to 12 and 14, in case that the decoupling structure 12 provided in the embodiments of the present disclosure is provided, the insertion loss of the first radiating unit 111 in the operating bandwidth range becomes smaller, which indicates that the radiation efficiency of the first radiating unit 111 is effectively improved.

With continued reference to FIGS. 10 to 12, it should be noted that a spacing between two microstrip lines 13 in a same microstrip line unit 120 may be set according to a size of the radiating unit 11, where the larger the size of the radiating unit 11 is, the larger the spacing between the two microstrip lines 13 in the same microstrip line unit 120 may be set, otherwise, the smaller the size of the radiating unit 11 is, the smaller the spacing between the two microstrip lines 13 in the same microstrip line unit 120 may be set, which is not specifically limited in the embodiments of the present disclosure.

With continued reference to FIGS. 6 and 11, optionally, the microstrip line 13 and the radiating unit 11 are disposed on a same layer.

As described above, the smaller the spacing d between the microstrip line 13 and the radiating unit 11 is, the better the decoupling effect of the decoupling structure 12 is. Therefore, in this embodiment, the microstrip line 13 and the radiating unit 11 are disposed on the same layer so that a smaller spacing between the microstrip line 13 and the radiating unit 11 may be obtained, thereby obtaining the better decoupling effect.

Moreover, the microstrip line 13 and the radiating unit 11 are disposed on the same film layer, so that the provision of one metal layer may be reduced, thereby achieving the purpose of reducing the production cost and reducing the thickness of the substrate. Moreover, the microstrip line 13 may be made of the same material as the radiating unit 11, so that the microstrip line 13 and the radiating unit 11 may be prepared in a same process, thereby shortening the process time.

With continued reference to FIGS. 5, 6, 10 and 11, optionally, the antenna provided in the embodiments of the present disclosure further includes a liquid crystal phase shifter 14 located on a side of the first substrate 10 facing away from the multiple radiating units 11, the liquid crystal phase shifter 14 includes a second substrate 15 and a third substrate 16 disposed opposite to each other, and the third substrate 16 is located on a side of the second substrate 15 facing away from the multiple radiating units 11. The liquid crystal phase shifter 14 further includes a delay line 17, a liquid crystal layer 18 and a ground metal layer 19. The liquid crystal layer 18 is located between the second substrate 15 and the third substrate 16, the delay line 17 is located between the third substrate 16 and the liquid crystal layer 18, and the ground metal layer 19 is located between the second substrate 15 and the liquid crystal layer 18. The ground metal layer 19 includes a first hollow portion 191, and one radiating unit of the radiating units 11 covers the first hollow portion 191 in a thickness direction of the first substrate 10.

As shown in FIGS. 5, 6, 10 and 11, the delay line 17 is configured to transmit a radio frequency signal, and the radio frequency signal may be provided by a feed source such as a radio frequency integrated circuit or a radio frequency chip.

Exemplarily, as shown in FIGS. 5, 6, 10 and 11, a feed structure 40 may be connected at one end of the delay line 17, the feed structure 40 may be bound to a flexible printed circuit (FPC) 41, and the radio frequency chip may be bound and connected to the flexible printed circuit 41 so that the delay line 17 receives a radio frequency signal provided by the radio frequency chip through the flexible printed circuit 41.

With continued reference to FIGS. 5, 6, 10 and 11, the feed structure 40 may include a feed segment 401, a first ground segment 402 and a second ground segment 403. The feed segment 401 is located between the first ground segment 402 and the second ground segment 403, and the feed segment 401 is connected to the delay line 17 for transmitting a radio frequency signal to the delay line 17. The feed segment 401, the first ground segment 402 and the second ground segment 403 constitute a coplanar waveguide (CPW) structure, and the coplanar waveguide structure has features of small volume, light weight and planar structure so that the coplanar waveguide structure has advantages of being convenient for obtaining a linear polarization operation, a circular polarization operation, a dual polarization operation, and a multi-band operation, moreover, the coplanar waveguide structure, as a microwave planar transmission structure with superior performance and convenient processing, has the performance advantages over microstrip lines in a millimeter wave frequency band.

It should be noted that a feeding manner of the delay line 17 is not limited to the above-described embodiments, and in other embodiments, the delay line 17 may be fed in other manners, for example, the radio frequency chip is directly disposed on the third substrate 16 so as to be directly connected to the delay line 17, which is not specifically limited in the embodiments of the present disclosure.

With continued reference to FIGS. 5, 6, 10 and 11, a radio frequency signal on the delay line 17 is transmitted in the liquid crystal layer 18 between the delay line 17 and the ground metal layer 19. Voltage signals are applied to the delay line 17 and the ground metal layer 19, respectively, so that an electric field may be formed between the delay line 17 and the ground metal layer 19. The electric field may drive liquid crystal molecules in the liquid crystal layer 18 to deflect, thereby changing a dielectric constant of the liquid crystal layer 18. The change of the dielectric constant of the liquid crystal layer 18 may shift the phase of the radio frequency signal transmitted on the delay line 17, thereby changing the phase of the radio frequency signal and achieving the phase shift function of the radio frequency signal. It should be understood that the voltage signal on the delay line 17 and the ground metal layer 19 is controlled, so that a deflection angle of liquid crystal molecules in the liquid crystal layer 18 may be controlled, further the phase adjusted during the phase shift of the radio frequency signal may be controlled, and finally a beam pointing of a radio frequency signal transmitted by the antenna may be controlled.

With continued reference to FIG. 5, FIG. 6, FIG. 10 and FIG. 11, a first hollow portion 191 is disposed on the ground metal layer 19. In the thickness direction of the first substrate 10, an overlapping region exists between the radiating unit 11, the first hollow portion 191 and the delay line 17. The liquid crystal layer 18 between the delay line 17 and the ground metal layer 19 shifts the phase of the radio frequency signal, that is, after the phase of the radio frequency signal is changed, the shifted radio frequency signal is coupled to the radiating unit 11 at the first hollow portion 191 of the ground metal layer 19, so that the radiating unit 11 radiates the signal outwardly.

The delay line 17 may be disposed in correspondence with the radiating unit 11. For example, the delay line 17 is disposed in one-to-one correspondence with the radiating unit 11, and radiating units 11 corresponding to different delay lines 17 are disposed insulated from each other. At this time, different voltage signals may be applied to the different delay lines 17 to enable liquid crystal molecules at corresponding positions of different delay lines 17 to have different deflection angles, so that the dielectric constants of the liquid crystal layer 18 at each position are different, further, phases of radio frequency signals at the positions of different delay lines 17 are adjusted, and finally, different beam pointings of different radio frequency signals are achieved.

It should be noted that materials of the radiating unit 11, the delay line 17 and the ground metal layer 19 may be selected from, but not limited to, low-impedance materials such as copper, silver, silver alloy, and copper alloy, so as to effectively reduce the energy loss caused by the high resistance, thereby improving the radiation efficiency of the antenna.

Further, a thickness of the radiating unit 11, a thickness of the delay line 17 and a thickness of the ground metal layer 19 may be set in the range of 1 μm to 3 μm, so that the thickness of the radiating unit 11, the delay line 17 and the ground metal layer 19 is relatively thin, thereby facilitating the lightweight design of the antenna. Moreover, the radio frequency signal flows through the surface of the metal layer at a certain depth, the certain depth is the skin depth. Therefore, the radiating unit 11, the delay line 17 and the ground metal layer 19 may have the above-described thickness range, so that the thickness of the radiating unit 11, the delay line 17 and the ground metal layer 19 is greater than or equal to the skin depth, thereby avoiding the energy loss caused by the radio frequency signal penetrating through the metal structures such as the delay line 17 and the ground metal layer 19.

With continued reference to FIGS. 5, 6, 10 and 11, a support structure 42 may also be disposed between the second substrate 15 and the third substrate 16, the support structure 42 is configured to support the second substrate 15 and the third substrate 16, thereby providing the accommodation space for the liquid crystal layer 18. The support structure 42 may be a rubber frame and the like, which is not limited in the embodiments of the present disclosure.

Figure 15:
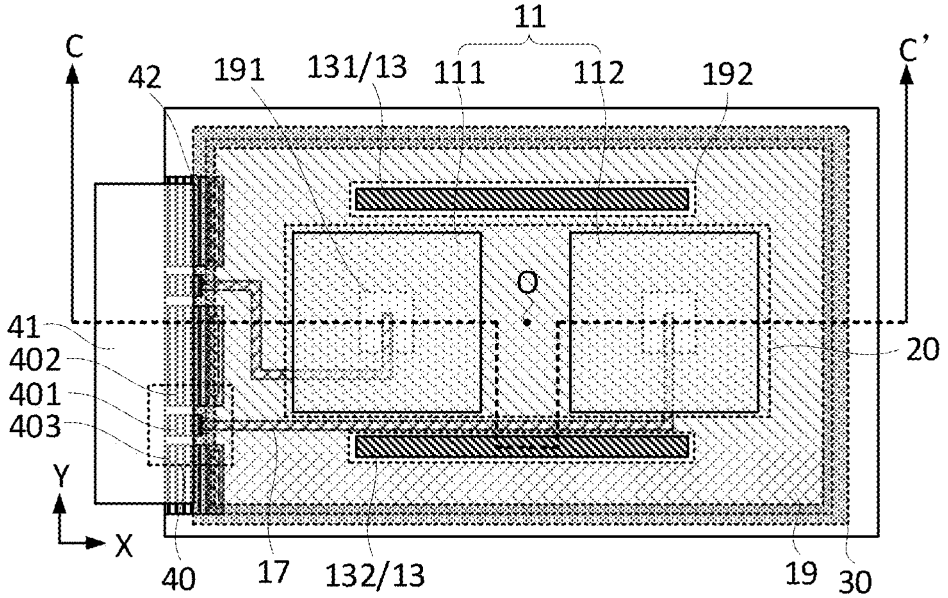
FIG. 15 is a schematic structural diagram of still another antenna according to an embodiment of the present disclosure.
Figure 16:
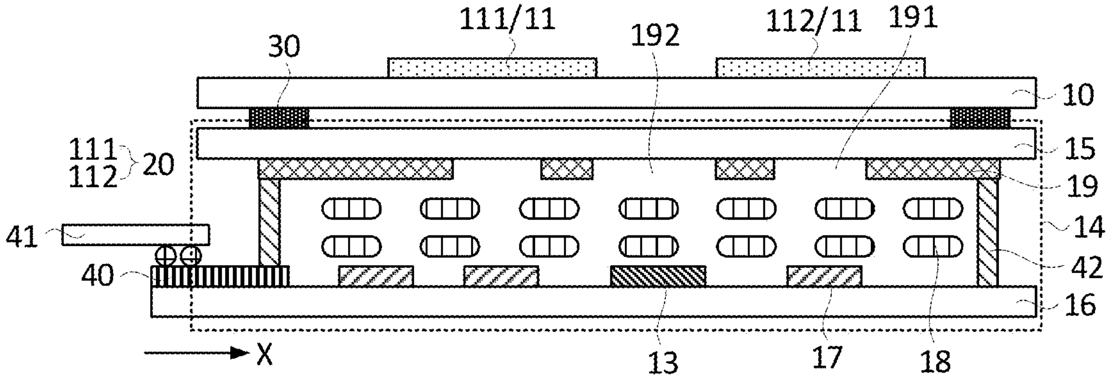
FIG. 16 is a schematic cross-sectional structural diagram of FIG. 15 taken along a direction of C-C'.
Figure 17:
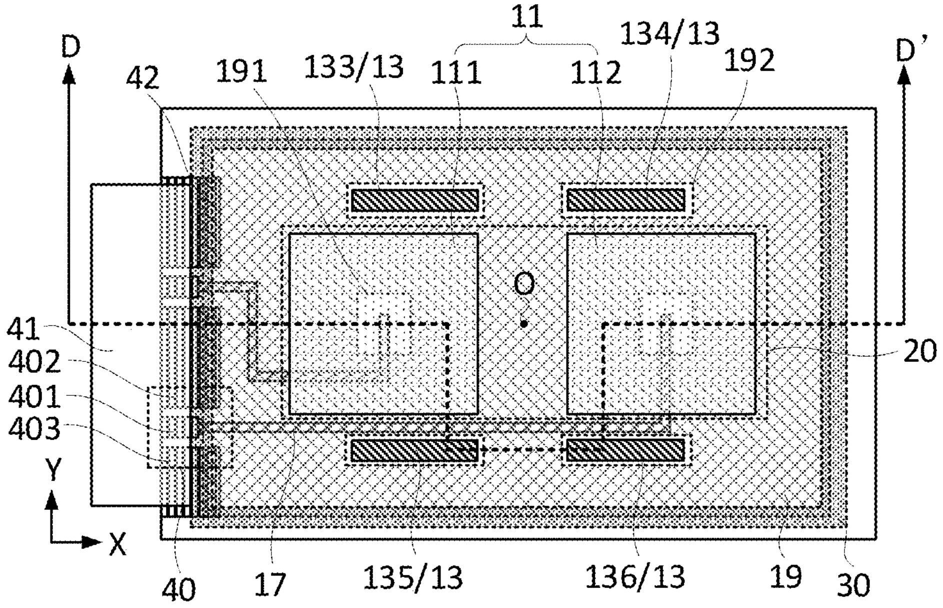
FIG. 17 is a schematic structural diagram of still another antenna according to an embodiment of the present disclosure.
Figure 18:
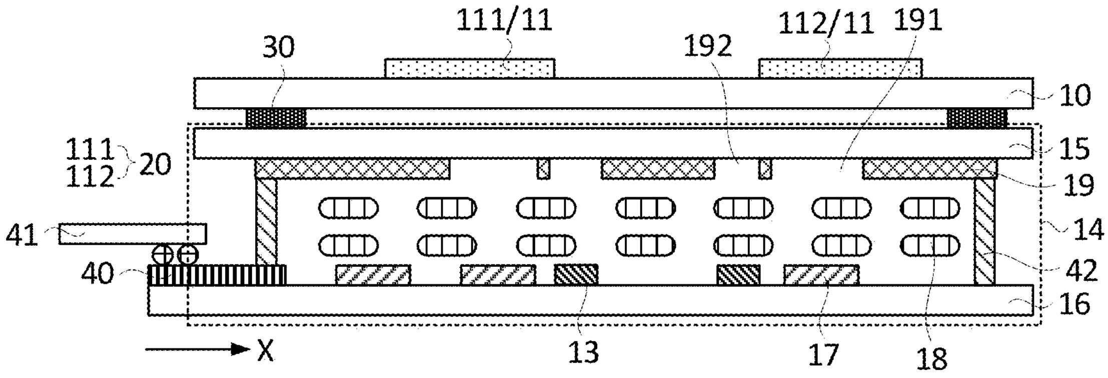
FIG. 18 is a schematic cross-sectional structural diagram of FIG. 17 taken along a direction of D-D'.

FIG. 15 is a schematic structural diagram of still another antenna according to an embodiment of the present disclosure, FIG. 16 is a schematic cross-sectional structural diagram of FIG. 15 taken along a direction of C-C', FIG. 17 is a schematic structural diagram of still another antenna according to an embodiment of the present disclosure, and FIG. 18 is a schematic cross-sectional structural diagram of FIG. 17 taken along a direction of D-D'. As shown in FIGS. 15 to 18, optionally, the microstrip line 13 and the delay line 17 are disposed on a same layer. The ground metal layer 19 includes a second hollow portion 192, and the second hollow portion 192 covers one microstrip line of the at least one microstrip line 13 in the thickness direction of the first substrate 10.

As shown in FIGS. 15 to 18, the microstrip line 13 and the delay line 17 are disposed on the same film layer, so that the provision of one metal layer may be reduced thereby achieving the purpose of reducing the production cost and reducing the thickness of the substrate. Moreover, the microstrip line 13 may be made of the same material as the delay line 17, so that the microstrip line 13 and the delay line 17 may be manufactured in the same process, thereby shortening the process time.

Moreover, a second hollow portion 192 corresponding to the microstrip line 13 is disposed on the ground metal layer 19, and an overlapping region exists between the second hollow portion 192 and the microstrip line 13 in the thickness direction of the first substrate 10, thereby avoiding the ground metal layer 19 from shielding the microstrip line 13 and affecting the electric field coupling between the radiating unit 11 and the microstrip line 13, and ensuring the decoupling effect between the microstrip line 13 and the adjacent radiating unit 11.

With continued reference to FIG. 5, FIG. 6, FIG. 10, FIG. 11, and FIG. 15 to FIG. 18, optionally, the first substrate 10 and the second substrate 15 are bonded by the first bonding adhesive 30, and a gap exists between the first bonding adhesive 30 and the radiating unit 11 in the thickness direction of the first substrate 10.

As shown in FIG. 5, FIG. 6, FIG. 10, FIG. 11, and FIG. 15 to FIG. 18, in this embodiment, the second substrate 15 of the liquid crystal phase shifter 14 is a separate substrate different from the first substrate 10. In the process of preparing the antenna, the radiating unit 11 may be formed on the first substrate 10, the ground metal layer 19 may be formed on the second substrate 15, and the first substrate 10 and the second substrate 15 are bonded by the first bonding adhesive 30, so that the preparation of the radiating unit 11 and the ground metal layer 19 may be achieved without providing the double-sided conductive metal layer on one substrate, thereby reducing the difficulty of the production process and improving the production efficiency.

Further, since a dielectric constant of the first bonding adhesive 30 is greater than a dielectric constant of the air, the first bonding adhesive 30 is set to not overlap with the radiation unit 11 in the thickness direction of the first substrate 10, so that the dielectric loss of the radio frequency signal between the first substrate 10 and the second substrate 15 may be reduced, thereby facilitating the improvement of the radiation efficiency of the antenna.

A specific setting shape of the first bonding adhesive 30 may be a character rectangular shape as shown in FIGS. 5, 6, 10, 11, and 15 to 18, but is not limited thereto. In other embodiments, the setting range of the first bonding adhesive 30 may be adjusted according to actual requirements.

It should be noted that, the smaller a thickness of the first bonding adhesive 30 is, the smaller the dissipation factor of the radio frequency signal between the first substrate 10 and the second substrate 15 is, thereby facilitating the improvement of the radiation efficiency of the antenna. However, if the thickness of the first bonding adhesive 30 is too small, the firmness of the adhesion of the first bonding adhesive 30 is affected, and thus the thickness of the first adhesive 30 may be set according to the material of the first bonding adhesive 30.

For example, when the first bonding adhesive 30 is a frame adhesive, the thickness of the first bonding adhesive 30 may be set to be about hundred micrometers, that is, the thickness of the first bonding adhesive 30 may be set to be in the range of 100 μm to 1000 μm. The first bonding adhesive 30 may be made to have a relatively thin thickness while ensuring the firmness of the adhesion between the first substrate 10 and the second substrate 15, so that the dissipation factor of the first bonding adhesive 30 to the radio frequency signal is relatively small, and the radiation efficiency of the antenna is favorably improved.

Figure 19:
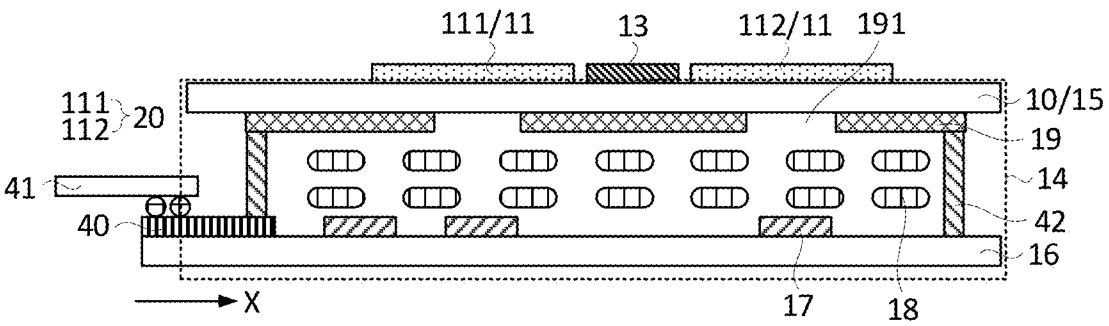
FIG. 19 is a schematic cross-sectional structural diagram of an antenna according to an embodiment of the present disclosure.
Figure 20:
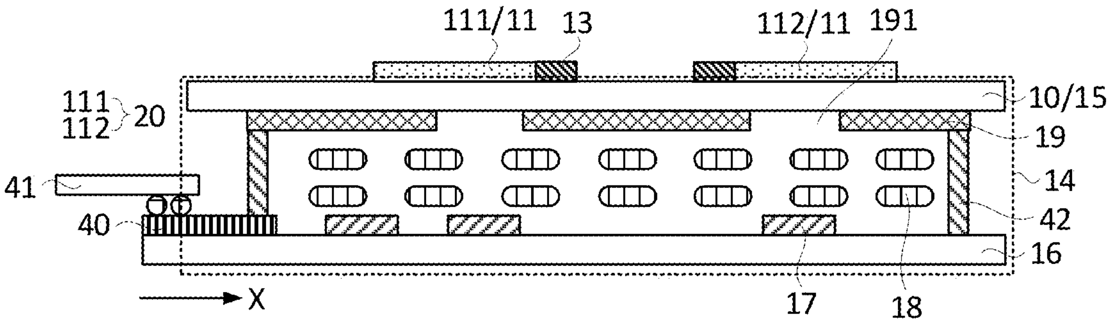
FIG. 20 is schematic cross-sectional structural diagram of another antenna according to an embodiment of the present disclosure.

FIG. 19 is a schematic cross-sectional structural diagram of an antenna according to an embodiment of the present disclosure, and FIG. 20 is schematic cross-sectional structural diagram of another antenna according to an embodiment of the present disclosure. As shown in FIGS. 19 and 20, optionally, the first substrate 10 and the second substrate 15 are a same substrate.

The antenna structure shown in FIG. 19 differs from the antenna structure shown in FIG. 6 in that the first substrate 10 and the second substrate 15 share the same substrate. Similarly, the antenna structure shown in FIG. 20 differs from the antenna structure shown in FIG. 11 in that the first substrate 10 and the second substrate 15 share the same substrate. Therefore, the explanation of the structure and terminology identical to or corresponding to the above-described embodiments is not described herein.

As shown in FIGS. 19 and 20, in this embodiment, the first substrate 10 and the second substrate 15 are provided as the same substrate, so that the overall thickness of the substrate may be reduced, thereby facilitating the lightweight design of the antenna. Moreover, the dissipation factor of the radio frequency signal on the substrate may be reduced and the radiation efficiency of the antenna can be improved.

Figure 21:
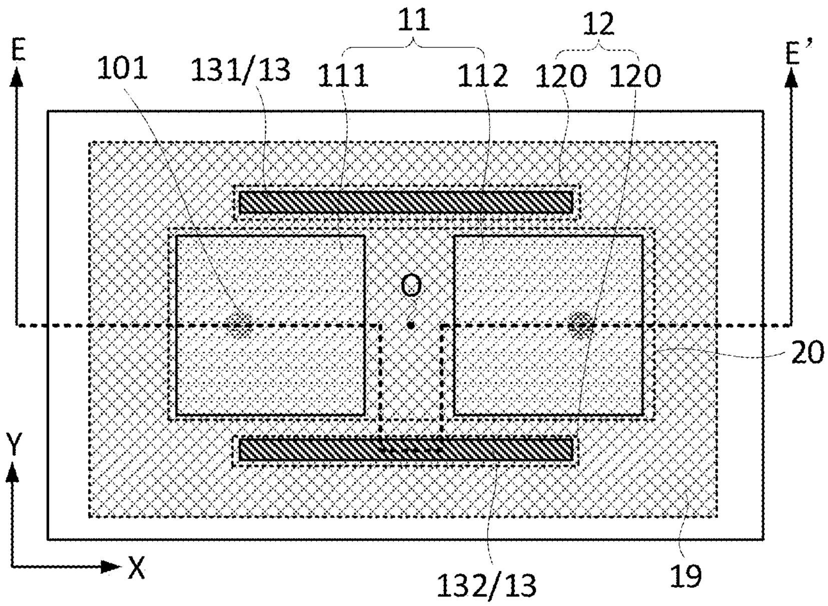
FIG. 21 is a schematic structural diagram of still another antenna according to an embodiment of the present disclosure.
Figure 22:
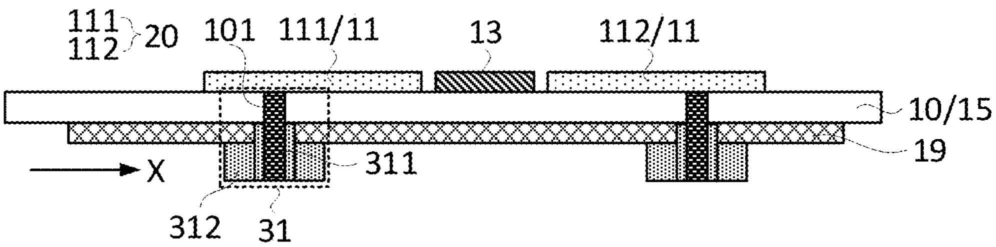
FIG. 22 is a schematic cross-sectional structural diagram of FIG. 21 taken along a direction of E-E'.
Figure 23:
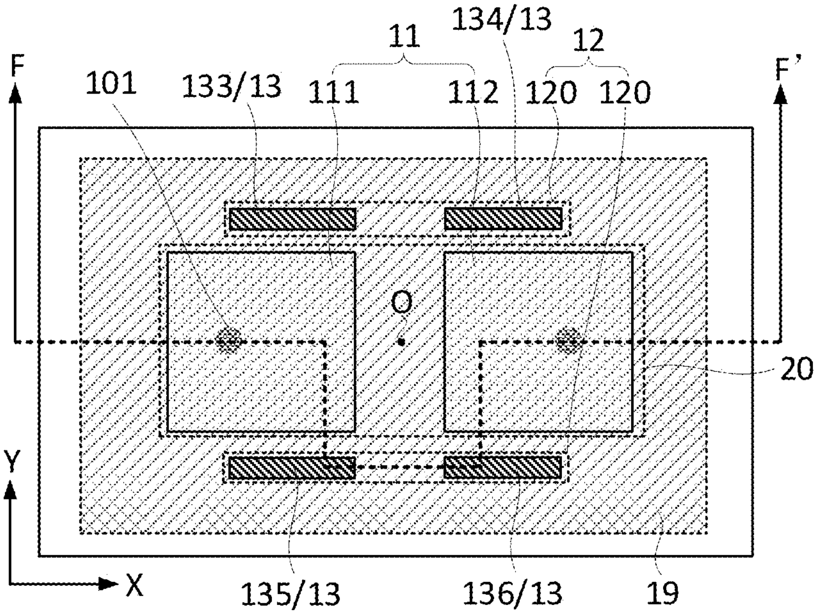
FIG. 23 is a schematic structural diagram of still another antenna according to an embodiment of the present disclosure.
Figure 24:
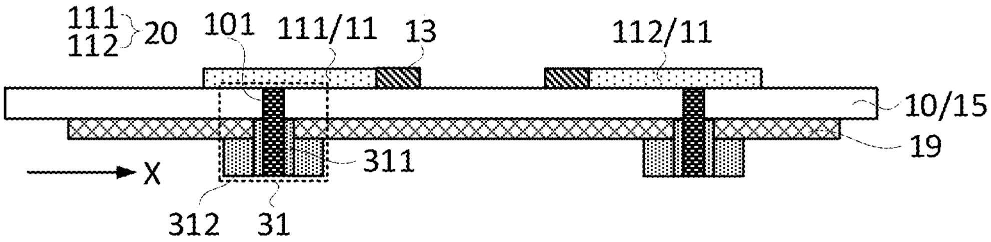
FIG. 24 is a schematic cross-sectional structural diagram of FIG. 23 taken along a direction of F-F'.

FIG. 21 is a schematic structural diagram of still another antenna according to an embodiment of the present disclosure, FIG. 22 is a schematic cross-sectional structural diagram of FIG. 21 taken along a direction of E-E', FIG. 23 is a schematic structural diagram of still another antenna according to an embodiment of the present disclosure, and FIG. 24 is a schematic cross-sectional structural diagram of FIG. 23 taken along a direction of F-F'. As shown in FIGS. 21 to 24, optionally, the antenna provided in the embodiments of the present disclosure further includes a ground metal layer 19 and a coaxial cable interface 31. The ground metal layer 19 is located on a side of the first substrate 10 facing away from the radiating unit 11, and the ground metal layer 19 at least partially overlaps with the radiating unit 11 in a thickness direction of the first substrate 10. The coaxial cable interface 31 is located on a side of the ground metal layer 19 facing away from the radiating unit 11, and the first substrate 10 includes a first through hole 101, and the coaxial cable interface 31 is connected to the radiating unit 11 through the first through hole 101.

Specifically, as shown in FIGS. 21-24, the coaxial cable interface 31 may include, but is not limited to, an inner conductive core 311 in the middle and an outer insulating sheath 312 outside the inner conductive core 311.

The inner conductive core 311 of the coaxial cable interface 31 is electrically connected to the radiating unit 11 through the first through hole 101 on the first substrate 10, and the coaxial cable interface 31 may enable the coaxial feeding of the radiating unit 11 through an externally connected radio frequency integrated circuit, so that a radio frequency electromagnetic field is excited between the radiating unit 11 and the ground metal layer 19, and the radio frequency electromagnetic field radiates outwards through the radiating unit 11.

With continued reference to FIGS. 21 to 24, it should be noted that the inner conductive core 311 of the coaxial cable interface 31 is separated from the ground metal layer 19 by the outer insulating sheath 312 of the coaxial cable interface 31 so as to ensure the insulation between the inner conductive core 311 of the coaxial cable interface 31 and the ground metal layer 19.

Further, when the first substrate 10 is a glass substrate, the first through hole 101 may be implemented by a single-substrate glass perforation technology. Moreover, the radiating unit 11 and the ground metal layer 19 may be prepared by a double-sided film forming process using a low temperature chemical vapor deposition (CVD) technology, but is not limited thereto.

Figure 25:
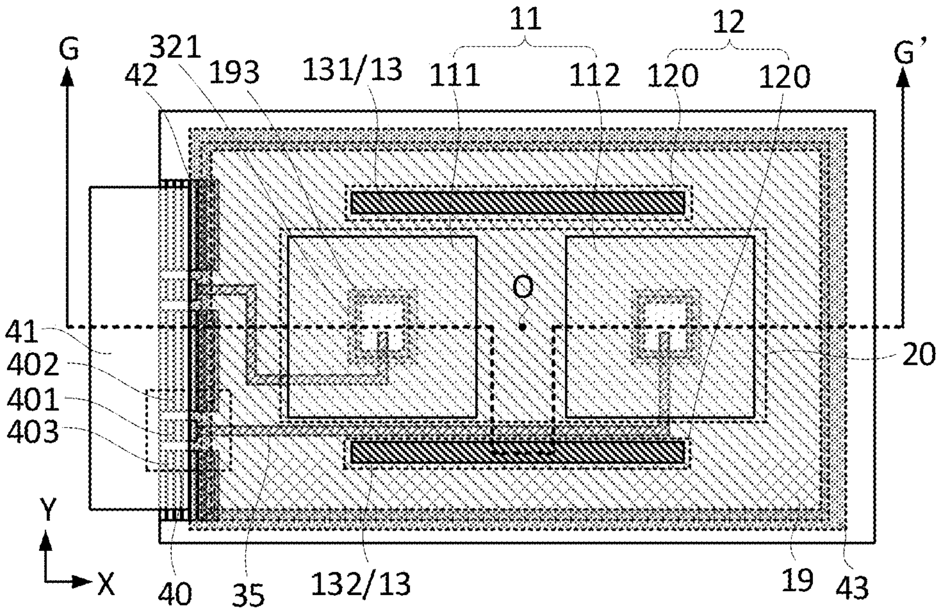
FIG. 25 is a schematic structural diagram of still another antenna according to an embodiment of the present disclosure.
Figure 26:
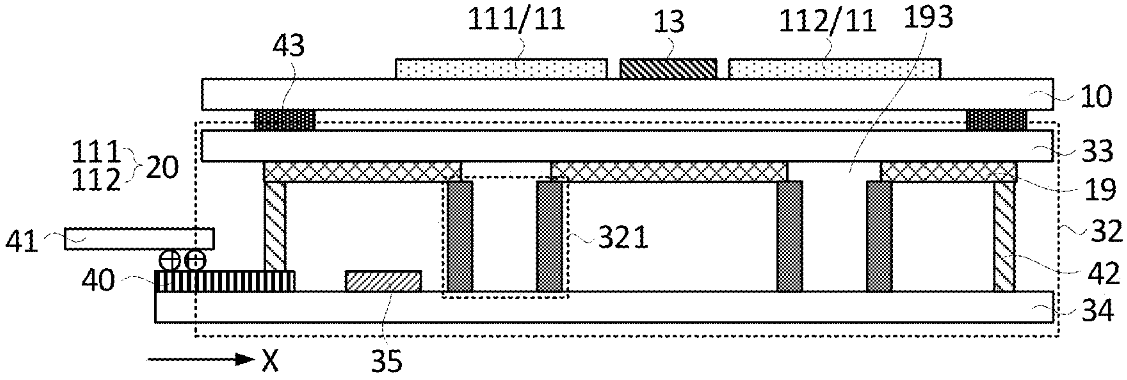
FIG. 26 is a schematic cross-sectional structural diagram of FIG. 25 taken along a direction of G-G'.

FIG. 25 is a schematic structural diagram of still another antenna according to an embodiment of the present disclosure, and FIG. 26 is a schematic cross-sectional structural diagram of FIG. 25 taken along a direction of G-G'. As shown in FIGS. 25 and 26, optionally, the antenna provided in the embodiments of the present disclosure further includes a waveguide structure 32 located on a side of the first substrate 10 facing away from the radiating unit 11. The waveguide structure 32 includes a fourth substrate 33 and a fifth substrate 34 disposed opposite to each other, and the fifth substrate 34 is located on a side of the fourth substrate 33 facing away from the radiating unit 11. The waveguide structure 32 includes a hollow waveguide tube 321 and a ground metal layer 19. The hollow waveguide tube 321 is located between the fourth substrate 33 and the fifth substrate 34, and the ground metal layer 19 is located between the fourth substrate 33 and the hollow waveguide tube 321. The ground metal layer 19 includes a third hollow portion 193, one radiating unit of the radiating units 11 covers the third hollow portion 193 in a thickness direction of the first substrate, and the hollow waveguide tube 321 at least partially overlaps with the third hollow portion 193 in the thickness direction of the first substrate. The hollow waveguide tube 321 is configured to feed the radio frequency signal provided by a feed source to the radiating units 11.

Specifically, as shown in FIGS. 25 and 26, a feed wire 35 may be disposed on the fifth substrate 34, and the feeding wire 35 is configured to transmit a radio frequency signal supplied from the feed source, where the feed source may be the radio frequency integrated circuit or a radio frequency chip, which is not specifically limited in the embodiments of the present disclosure.

Exemplarily, as shown in FIGS. 25 and 26, a feed structure 40 may be connected to one end of the feeding wire 35, the feed structure 40 may be bound to a flexible printed circuit (FPC) 41, and the radio frequency chip may be bound and connected to the flexible printed circuit 41 so that the feed wire 35 is configured to receive a radio frequency signal provided by the radio frequency chip through the flexible printed circuit 41.

Optionally, as shown in FIGS. 25 and 26, the feed structure 40 may include a feed segment 401, a first ground segment 402 and a second ground segment 403. The feed segment 401 is located between the first ground segment 402 and the second ground segment 403, the feed segment 401 is connected to the delay line 17 for transmitting a radio frequency signal to the delay line 17. The feed segment 401, the first ground segment 402 and the second ground segment 403 constitute a coplanar waveguide (CPW) structure. The Coplanar waveguide structure has the characteristics of a small volume, a light weight and a planar structure, so that the coplanar waveguide structure has the advantages of being convenient for obtaining a linear polarization operation, a circular polarization operation, a dual polarization operation, a multi-band operation, moreover, the coplanar waveguide structure, as a microwave planar transmission structure with superior performance and convenient processing, has the performance advantage over microstrip lines in a millimeter-wave band.

It should be noted that the feeding manner of the feed wire 35 is not limited to the above-described embodiments, and in other embodiments, the feed wire 35 may be fed in other manners.

Figure 27:
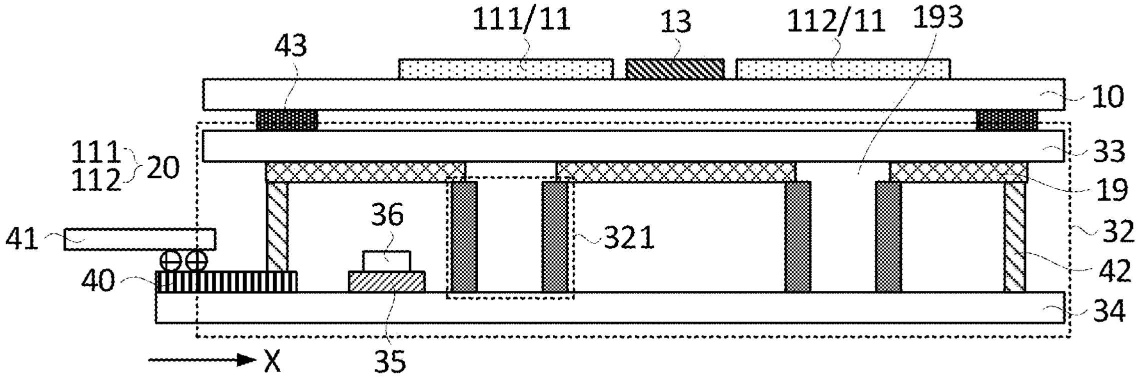
FIG. 27 is a schematic cross-sectional structural diagram of still another antenna according to an embodiment of the present disclosure.

Exemplarily, FIG. 27 is a schematic cross-sectional structural diagram of still another antenna according to an embodiment of the present disclosure.

The antenna structure shown in FIG. 27 differs from the antenna structure shown in FIG. 26 in that an antenna feed radio-frequency chip 36 is directly disposed on the fifth substrate 34, so that the antenna feed radio-frequency chip 36 may be directly connected to the feed wire 35 so as to achieve the feeding of the radio-frequency signal, and the explanation of the structure and terminology identical to or corresponding to the above-described embodiments is not described herein.

With continued reference to FIGS. 25 and 26, along the thickness direction of the first substrate 10, the feed wire 35 at least partially overlaps with the hollow waveguide tube 321 to feed the radio frequency signal transmitted by the feed wire 35 into the hollow waveguide tube 321.

The hollow waveguide tube 321 is a metal tube structure having a hollow cavity, and the electromagnetic energy may be guided and propagated in the inner space of the hollow waveguide tube 321, and the metal tube wall may prevent the leakage of electromagnetic energy to outside, and therefore the signal transmission may be achieved with extremely low loss.

With continued reference to FIGS. 25 and 26, the ground metal layer 19 is provided with a third hollow portion 193, an overlapping region exists between the radiating unit 11, the third hollow portion 193 and the hollow waveguide tube 321 in the thickness direction of the first substrate 10, and the radio frequency signal transmitted by the hollow waveguide tube 321 is coupled to the radiating unit 11 through the third hollow portion 193 of the ground metal layer 19 so that the radiating unit 11 radiates the signal outwardly, thereby achieving the waveguide feed to the radiating unit 11.

The material of the tube wall of the hollow waveguide tube 321 may be selected from, but not limited to, low-impedance material such as copper, so as to effectively reduce the energy loss caused by too high resistance, thereby improving the radiation efficiency of the antenna.

Further, the thickness of the tube wall of the hollow waveguide tube 321 may be set in the range of 1 μm to 3 μm, so that the thickness of the tube wall of the hollow waveguide tube 321 is relatively thin, thereby facilitating the reduction of the occupied space of the hollow waveguide tube 321. Moreover, the thickness of the hollow waveguide tube 321 may be made to be greater than or equal to the skin depth, thereby avoiding the energy loss caused by the penetration of the radio frequency signal through the tube wall of the hollow waveguide tube 321.

With continued reference to FIG. 25, the hollow waveguide tube 321 may be a rectangular waveguide tube so as to implement the signal transmission in a transverse electric (TE) mode or transverse magnetic (TM) mode, but is not limited to.

It should be noted that the height of the hollow waveguide tube 321 may be set according to the operating wavelength of the antenna. For example, the height of the hollow waveguide tube 321 may be set to be in the same order of magnitude as the operating wavelength of the antenna to achieve the better signal transmission performance. For example, if the hollow waveguide tube 321 is applied to a millimeter-wave antenna, then the height of the hollow waveguide tube 321 may be on the order of millimeters. If the hollow waveguide tube 321 is applied to a centimeter wave antenna, then the height of the hollow waveguide tube 321 may be on the order of centimeters.

Moreover, the diameter of the hollow waveguide tube 321 may be set according to the operating wavelength (operating frequency) of the antenna, which is not specifically limited in the embodiments of the present disclosure.

With continued reference to FIGS. 25 to 27, a support structure 42 may also be disposed between the fourth substrate 33 and the fifth substrate 34, the support structure 42 is configured to support the fourth substrate 33 and the fifth substrate 34, thereby providing the accommodation space for the hollow waveguide tube 321. The support structure 42 may be made of a material such as a resin to provide the good support performance, which is not limited in the embodiments of the present disclosure.

With continued reference to FIGS. 25 to 27, optionally, the first substrate 10 and the fourth substrate 33 are bonded by the second bonding adhesive 43, and a gap exists between the second bonding adhesive 43 and the radiating unit 11 in the thickness direction of the first substrate 10.

As shown in FIGS. 25 to 27, in this embodiment, the fourth substrate 33 of the waveguide structure 32 is a separate substrate different from the first substrate 10. In a process of preparing the antenna, the radiating unit 11 may be formed on the first substrate 10, the ground metal layer 19 may be formed on the fourth substrate 33, and the first substrate 10 and the fourth substrate 33 may be adhered to each other by the second bonding adhesive 43, so that the preparation of the radiating unit 11 and the ground metal layer 19 may be achieved without disposing the double-sided conductive metal layer on one substrate, thereby reducing the difficulty of the production process and improving the production efficiency.

Further, since the dielectric constant of the second bonding adhesive 43 is greater than the dielectric constant of the air, no overlapping exists between the second bonding adhesive 43 and the radiating unit 11 in the thickness direction of the first substrate 10, so that the dielectric loss of the radio frequency signal between the first substrate 10 and the fourth substrate 33 may be reduced, thereby facilitating the improvement of the radiation efficiency of the antenna.

The specific setting shape of the second bonding adhesive 43 may be a character rectangular shape as shown in FIGS. 25 to 27, but is not limited thereto. In other embodiments, the setting range of the second bonding adhesive 43 may be adjusted according to actual requirements.

It should be noted that, the smaller the thickness of the second bonding adhesive 43 is, the smaller the dissipation factor of the radio frequency signal between the first substrate 10 and the fourth substrate 33 is, thereby facilitating the improvement of the radiation efficiency of the antenna. However, the thickness of the second bonding adhesive 43 is too small, which affects the firmness of the adhesion of the second bonding adhesive 43. Therefore, the thickness of the second bonding adhesive 43 may be set according to the material of the second bonding adhesive 43.

For example, when the second bonding adhesive 43 is a frame adhesive, the thickness of the second bonding adhesive 43 may be set to be about hundred microns, that is, the thickness of the second bonding adhesive 43 may be set to be in the range of 100 μm to 1000 μm, so that the second bonding adhesive 43 may have a relatively thin thickness while ensuring the firmness of the adhesion between the first substrate 10 and the fourth substrate 33, so that the dissipation factor of the second bonding adhesive 43 to the radio frequency signal is relatively small, thereby improving the radiation efficiency of the antenna.

Figure 28:
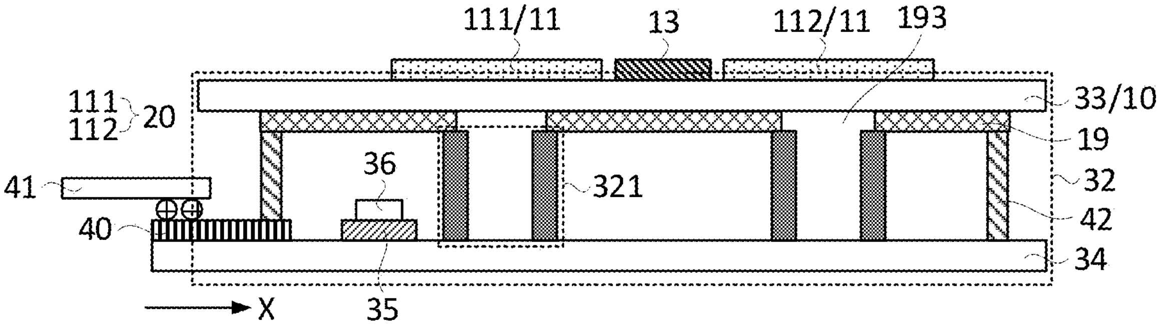
FIG. 28 is a schematic cross-sectional structural diagram of still another antenna according to an embodiment of the present disclosure.

FIG. 28 is a schematic cross-sectional structural diagram of still another antenna according to an embodiment of the present disclosure. As shown in FIG. 28, optionally, the first substrate 10 and the fourth substrate 33 are a same substrate.

As shown in FIG. 28, in this embodiment, the first substrate 10 and the fourth substrate 33 are provided as the same substrate, so that the overall thickness of the substrate may be reduced thereby facilitating the lightweight design of the antenna. Meanwhile, the dissipation factor of the radio frequency signal on the substrate may be reduced and the radiation efficiency of the antenna can be improved.

The antenna structure shown in FIG. 28 differs from the antenna structure shown in FIG. 27 in that the first substrate 10 and the fourth substrate 33 share the same substrate, and the explanation of the structure and terminology identical to or corresponding to the above-described embodiments is not described herein.

Figure 29:
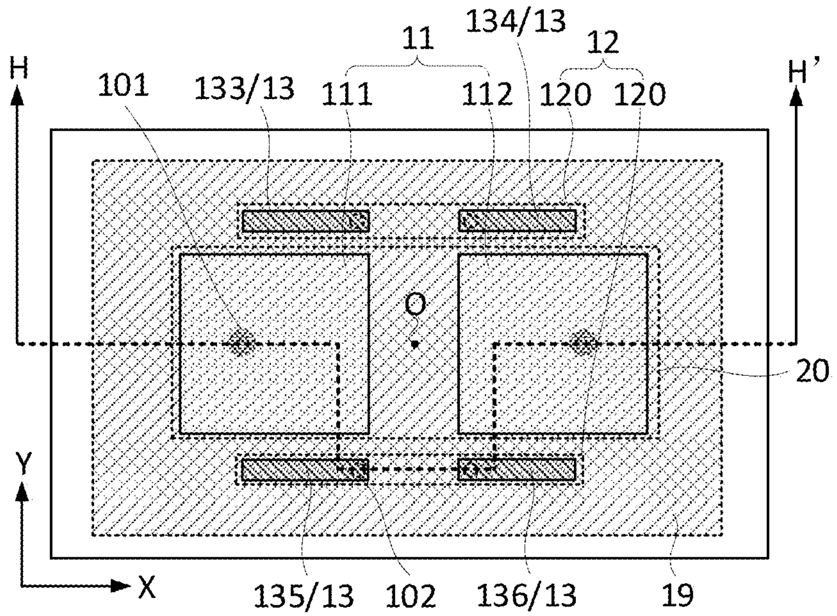
FIG. 29 is a schematic structural diagram of still another antenna according to an embodiment of the present disclosure.
Figure 30:
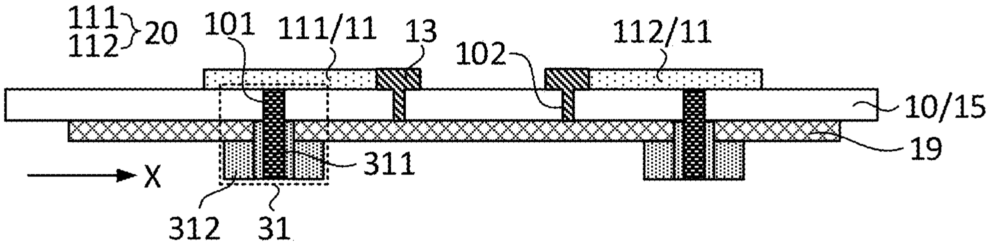
FIG. 30 is a schematic cross-sectional structural diagram of FIG. 30 taken along a direction of H-H'.

FIG. 29 is a schematic structural diagram of still another antenna according to an embodiment of the present disclosure, and FIG. 30 is a schematic cross-sectional structural diagram of FIG. 30 taken along a direction of H-H'. As shown in FIGS. 4 to 30, optionally, the microstrip line 13 is floated, or the microstrip line 13 is grounded.

Exemplarily, as shown in FIGS. 4 to 28, the microstrip line 13 may be disposed in a floating manner, that is, the microstrip line 13 is not electrically connected to any signal line, and the microstrip line 13 is not connected to any signal. With such arrangement, the connection structure of the microstrip line 13 is simple and is easy to implement. Moreover, the microstrip line 13 is connected to other structures without punching a hole in the first substrate 10, and the liquid crystal leakage caused by punching the liquid crystal box may be avoided in the scheme of adopting the liquid crystal phase shifter 14.

In other embodiments, as shown in FIGS. 29 and 30, the microstrip line 13 may also be grounded. The microstrip line 13 is grounded so that the microstrip line 13 is not susceptible to the electrostatic accumulation of the external environment, so that the phase shift or frequency shift of the radio frequency signal may be avoided, and the parasitic electric field formed on the microstrip line 13 is more stable, whereby the compensation for the direct coupling field between the adjacent radiating units 11 is more stable, and thus the decoupling effect is more stable.

It should be noted that, in the antenna structure provided in any one of the above-described embodiments, the microstrip line 13 may be grounded to make the antenna operate more stable, which may be set by those skilled in the art according to actual requirements, and will not be described in detail herein.

With continued reference to FIGS. 29 and 30, optionally, the antenna provided in the embodiments of the present disclosure further includes a ground metal layer 19, the ground metal layer 19 is located on a side of the first substrate 10 facing away from the radiating unit 11, and the ground metal layer 19 at least partially overlaps with the radiating unit 11 in the thickness direction of the first substrate 10. The first substrate 10 includes a second through hole 102, the second through hole 102 at least partially overlaps with the microstrip line 13 in the thickness direction of the first substrate 10, and the microstrip line 13 is connected to the ground metal layer 19 through the second through hole 102.

Specifically, as shown in FIGS. 29 and 30, the microstrip line 13 can be electrically connected to the ground metal layer 19 through the second through hole 102 in the first substrate 10 to achieve the ground arrangement of the microstrip line 13, whereby there is no need to an additional interface of the microstrip line 13 for grounding, and the structure is simpler. Moreover, when the first substrate 10 is the glass substrate, the second through hole 102 may be achieved by the single-substrate glass perforation technology, and the process is easy to achieve.

It should be noted that a diameter of the second through hole 102 may also be simulated and optimized for the operating frequency of the antenna, impedance matching requirements, and radiation performance and loss requirements. For example, the diameter of the second through hole 102 may be set to be on the same order of magnitude as the operating wavelength of the antenna to achieve the better decoupling effect. For example, if the decoupling structure 12 is applied to the millimeter-wave antenna, then the second through hole 102 may be on the order of millimeters. If the decoupling structure 12 is applied to the centimeter-wave antenna, then the second through hole 102 is on the order of centimeters.

Figure 31:
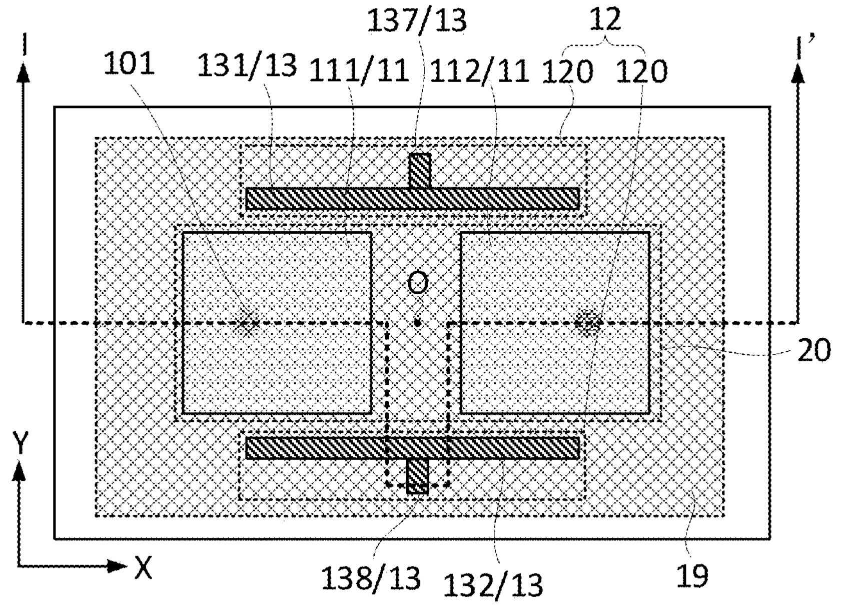
FIG. 31 is a schematic structural diagram of still another antenna according to an embodiment of the present disclosure.
Figure 32:
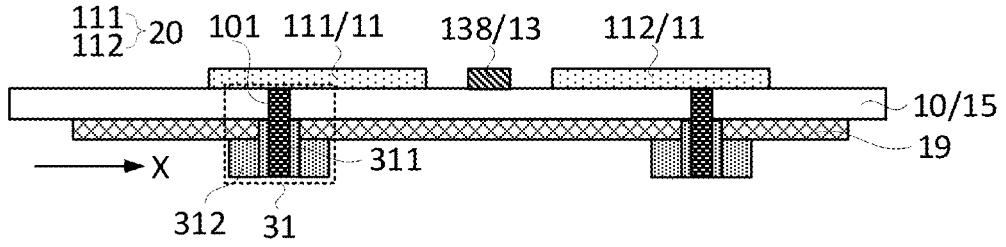
FIG. 32 is a schematic cross-sectional structural diagram of FIG. 31 taken along a direction of I-I'.

FIG. 31 is a schematic structural diagram of still another antenna according to an embodiment of the present disclosure, and FIG. 32 is a schematic cross-sectional structural diagram of FIG. 31 taken along a direction of I-I'. As shown in FIGS. 31 and 32, optionally, a first drainage microstrip line 137 is disposed on a side of the first microstrip line 131 facing away from the radiating unit group 20, the first drainage microstrip line 137 extends in the second direction Y, and one end of the first drainage microstrip line 137 is connected to the first microstrip line 131 at a center position of the first microstrip line 131. A second drainage microstrip line 138 is disposed on a side of the second microstrip line 132 facing away from the radiating unit group 20, the second drainage microstrip line 138 extends in the second direction Y, and one end of the second drainage microstrip line 138 is connected to the second microstrip line 132 at a center position of the second microstrip line 132. A vertical projection of the first drainage microstrip line 137 on the first substrate 10 and a vertical projection of the second drainage microstrip line 138 on the first substrate 10 are symmetrically disposed about the center point O of the vertical projection of the radiating unit group 20 on the first substrate 10.

Specifically, as shown in FIGS. 31 and 32, in the two microstrip line units 120 of the decoupling structure 12, one microstrip line unit 120 is composed of a first microstrip line 131 and a first drainage microstrip line 137, and the other microstrip line unit 120 is composed of a second microstrip line 132 and a second drainage microstrip line 138, that is, the decoupling structure 12 is composed of four microstrip lines 13, namely, the first microstrip line 131, the first drainage microstrip line 137, the second microstrip line 132 and the second drainage microstrip line 138.

As shown in FIGS. 31 and 32, both the first drainage microstrip line 137 and the second drainage microstrip line 138 extend in the second direction Y, and one end of the first drainage microstrip line 137 is connected to the first microstrip line 131 at the center position of the first microstrip line 131, and one end of the second drainage microstrip line 138 is connected to the second microstrip line 132 at the center position of the second microstrip line 132, so that the vertical projection of the one microstrip line unit of the two microstrip line units 120 on the first substrate 10 and the vertical projection of the other microstrip line unit of the two microstrip line units 120 on the first substrate 10 are symmetrically disposed about the center point O of the vertical projection of the radiating unit group 20 on the first substrate 10, so that the parasitic electric fields formed on the two microstrip line units 120 are symmetrical to the electric field compensation contributions of the first radiating unit 111 and the second radiating unit 112, thereby avoiding the introduction of new additional coupled electric fields and preventing the decoupling effect of the decoupling structure 12.

Moreover, the first drainage microstrip line 137 may serve as the drainage function. One end of the first drainage microstrip line 137 is disposed to be connected to the first microstrip line 131 at the center position of the first microstrip line 131 to form a T-shaped microstrip line structure, so that the induced charge on the first microstrip line 131 is concentrated at a connection point between the first drainage microstrip line 137 and the first microstrip line 131, that is, the current density at the connection point between the first drainage microstrip line 137 and the first microstrip line 131 is maximum, whereby the parasitic electric field strength at the connection point of the first drainage microstrip line 137 and the first microstrip line 131 is maximum, and further, in the first direction X, the parasitic electric field formed on the microstrip line unit 120 in which the first drainage microstrip line 137 and the first microstrip line 131 are located is made symmetrical to the electric field compensation contribution of the first radiating unit 111 and the second radiating unit 112, thereby improving the decoupling effect of the decoupling structure 12.

Similarly, the second drainage microstrip line 138 may also serve as the drainage function. One end of the second drainage microstrip line 138 is disposed to be connected to the second microstrip line 132 at the center of the second microstrip line 132 to form a T-shaped microstrip line structure, so that the induced charge on the second microstrip line 132 is concentrated at the connection point of the second drainage microstrip line 138 and the second microstrip line 132, that is, the current density at the connection point of the second drainage microstrip line 138 and the second microstrip line 132 is maximum, whereby the parasitic electric field strength at the connection point of the second drainage microstrip line 138 and the second microstrip line 132 is maximum, and further, in the first direction X, the parasitic electric field formed on the microstrip line unit 120 in which the second drainage microstrip line 138 and the second microstrip line 132 are located is symmetrical to the electric field compensation contribution of the first radiating unit 111 and the second radiating unit 112, thereby improving the decoupling effect of the decoupling structure 12.

Figure 33:
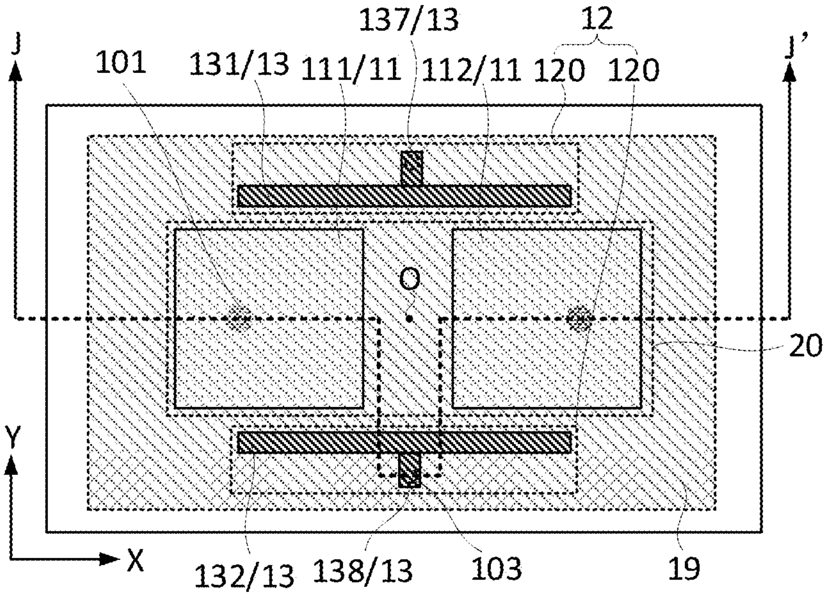
FIG. 33 is a schematic structural diagram of still another antenna according to an embodiment of the present disclosure.
Figure 34:
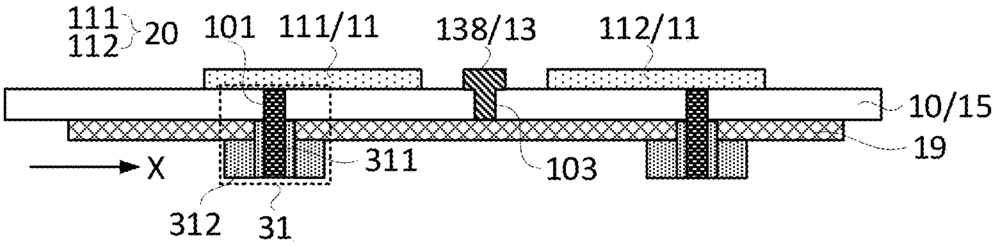
FIG. 34 is a schematic cross-sectional structural diagram of FIG. 33 taken along a direction of J-J'.

FIG. 33 is a schematic structural diagram of still another antenna according to an embodiment of the present disclosure, and FIG. 34 is a schematic cross-sectional structural diagram of FIG. 33 taken along a direction of J-J'. As shown in FIGS. 33 and 34, optionally, the first drainage microstrip 137 is grounded, and the second drainage microstrip 138 is grounded.

Specifically, as shown in FIGS. 33 and 34, as previously described, when the T-type microstrip line structure is energized, the induced charge is concentrated at the connection point of the first drain microstrip line 137 and the first microstrip line 131, and at the connection point of the second drain microstrip line 138 and the second microstrip line 132, that is, the current density at the connection point of the first drain microstrip line 137 and the first microstrip line 131 is maximum, and the parasitic electric field strength at the connection point of the second drain microstrip line 138 and the second microstrip line 132 is maximum.

In this embodiment, the first drain microstrip 137 and the second drain microstrip 138 are grounded to avoid the excessive current density at the connection point of the first drain microstrip 137 and the first microstrip 131 and at the connection point of the second drain microstrip 138 and the second microstrip 132, or to avoid the secondary coupling field causing damage to the indirect coupling field due to the accumulating polarization of electric charges at the connection point of the first drainage microstrip line 137 and the first microstrip line 131, and at the connection point of the second drainage microstrip line 138 and the second microstrip line 132, thereby ensuring the decoupling effect.

With continued reference to FIGS. 33 and 34, optionally, a ground metal layer 19 is disposed on a side of the first substrate 10 facing away from the radiating unit 11. The first substrate 10 further includes third through holes 103, at least one third through hole 103 at least partially overlaps with the first drainage microstrip line 137 in the thickness direction of the first substrate 10, and at least one third through hole 103 at least partially overlaps with the second drainage microstrip line 138, so that the first drainage microstrip line 137 and the second drainage microstrip line 138 are connected to the ground metal layer 19 through the third through holes 103, thereby enabling the ground arrangement of the first drainage microstrip line 137 and the second drainage microstrip line 138. When the T-shaped microstrip line structure is energized, the first drain microstrip line 137 and the second drain microstrip line 138 function as drainage, so that the induced charge flows to the ground metal layer 19 through the first drain microstrip line 137 and the second drain microstrip line 138, thereby avoiding the secondary coupling field causing damage to the indirect coupling field due to the accumulating polarization of electric charges at the connection point of the first drainage microstrip line 137 and the first microstrip line 131, and at the connection point of the second drainage microstrip line 138 and the second microstrip line 132, and ensuring the decoupling effect.

Moreover, the first drainage microstrip 137 and the second drainage microstrip 138 are not additionally provided with an interface for grounding, and the structure is simple. When the first substrate 10 is a glass substrate, the third through hole 103 may be implemented by a single-substrate glass perforation technology, and the process is easy to achieve.

It should be noted that a diameter of the third through hole 103 may also be simulated and optimized for the operation frequency of the antenna, impedance matching requirements, and radiation performance and loss requirements. For example, the diameter of the third through hole 103 may be set to be on the same order of magnitude as the operating wavelength of the antenna to achieve the better decoupling effect. For example, if the decoupling structure 12 is applied to the millimeter-wave antenna, then the third through hole 103 may be on the order of millimeters. If the decoupling structure 12 is applied to the centimeter-wave antenna, then the third through hole 103 is on the order of centimeters.

Figure 35:
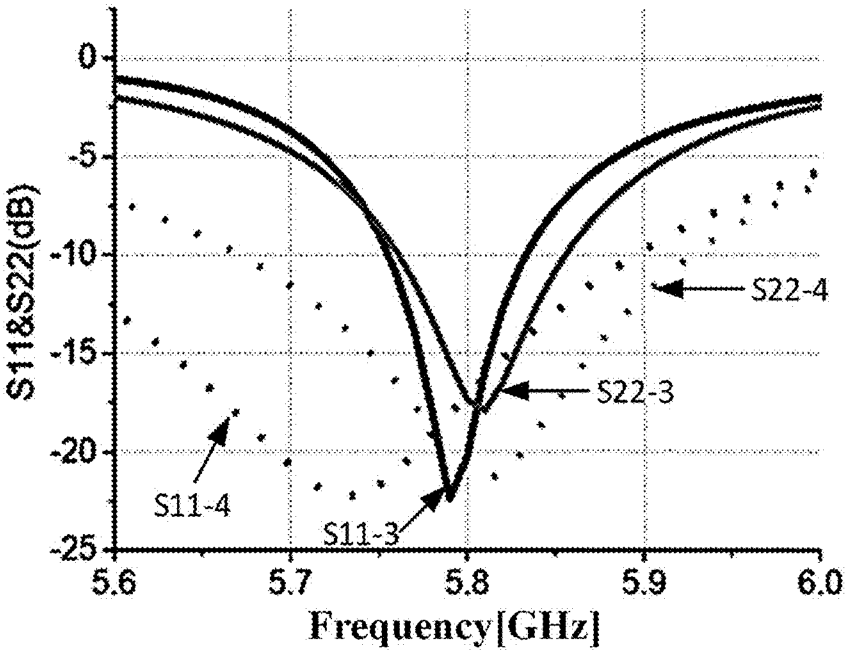
FIG. 35 is a schematic diagram of simulation results of still another antenna according to an embodiment of the present disclosure.

FIG. 35 is a schematic diagram of simulation results of still another antenna according to an embodiment of the present disclosure, an example in which the first radiating unit 111 is operated and the second radiating unit 112 is not operated, that is, only the first radiating unit 111 is fed is used in FIG. 35 for description. A curve S11-3 represents that a return loss of the first radiating unit 111 in case that the decoupling structure 12 is provided, a curve S22-3 represents a return loss of the second radiating unit 112 in case that the decoupling structure 12 is provided, a curve S11-4 represents a return loss of the first radiating unit 111 in case that the decoupling structure 12 is not provided, and a curve S22-4 represents a return loss of the second radiating unit 112 in case that the decoupling structure 12 is not provided.

As shown in FIG. 35, after the decoupling structure 12 provided in the embodiments of the present disclosure is provided, the return loss of the first radiating unit 111 in the operating bandwidth range does not become larger, which indicates that the radiation performance of the first radiating unit 111 is not affected. The return loss of the second radiating unit 112 in the operating bandwidth range becomes larger, which indicates that the influence of the electric field of the first radiating unit 111 on the second radiating unit 112 becomes smaller, and the isolation between the first radiating unit 111 and the second radiating unit 112 is effectively improved.

Figure 36:
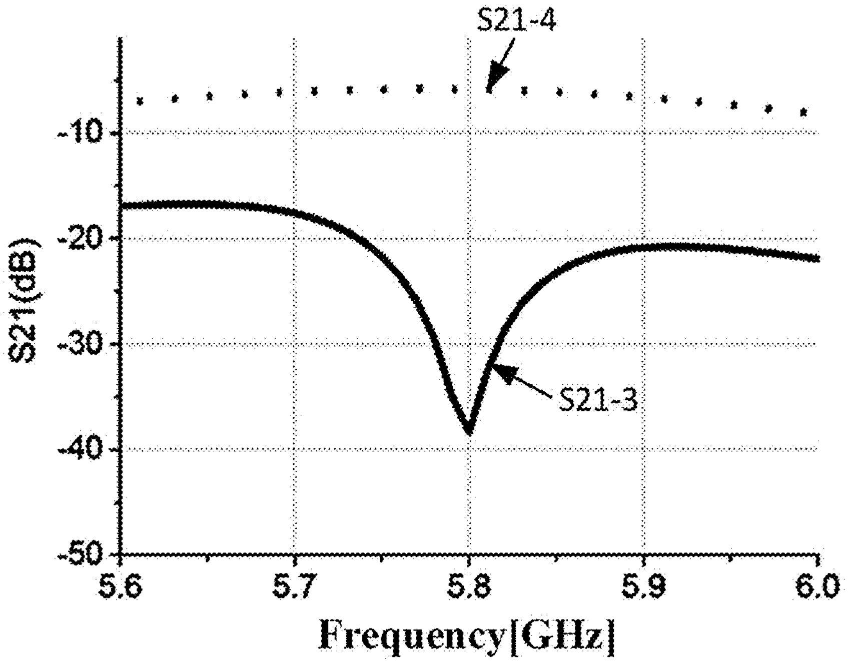
FIG. 36 is a schematic diagram of simulation results of still another antenna according to an embodiment of the present disclosure.

FIG. 36 is a schematic diagram of simulation results of still another antenna according to an embodiment of the present disclosure, an example in which the first radiating unit 111 is operated, and the second radiating unit 112 is not operated, that is, only the first radiating unit 111 is fed in FIG. 36 for description. A curve S21-3 represents that an insertion loss of the first radiating unit 111 in case that the decoupling structure 12 is provided, and a curve S21-4 represents that an insertion loss of the first radiating unit 111 in case that the decoupling structure 12 is not provided. As shown in FIGS. 33, 34 and 36, in case that the decoupling structure 12 provided in the embodiments of the present disclosure is provided, the insertion loss of the first radiating unit 111 in the operating bandwidth range becomes smaller, which indicates that the radiation efficiency of the first radiating unit 111 is effectively improved.

Figure 37:
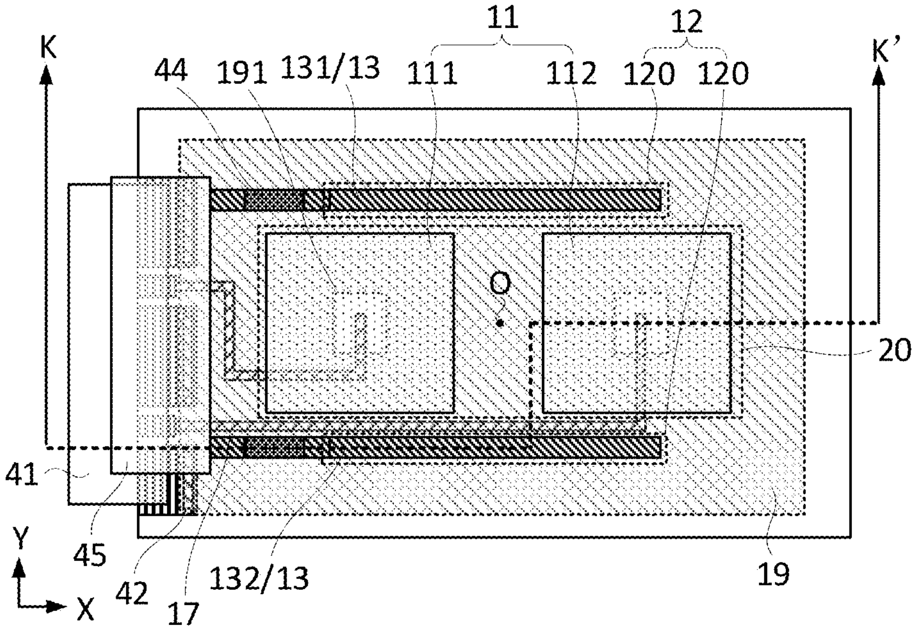
FIG. 37 is a schematic structural diagram of still another antenna according to an embodiment of the present disclosure.
Figure 38:
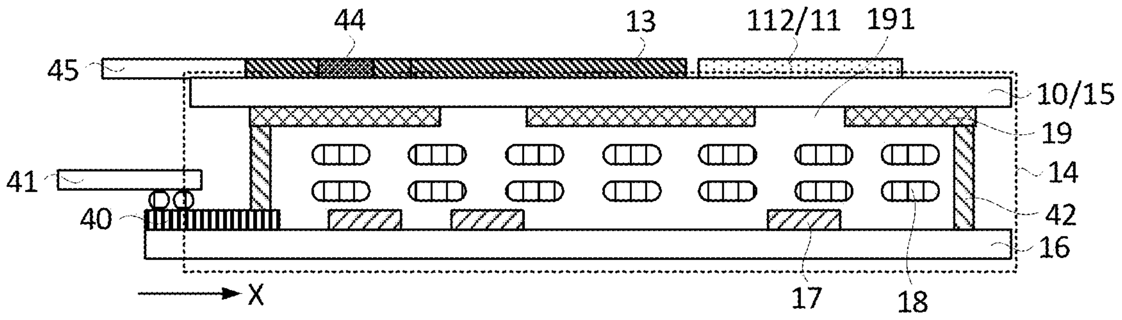
FIG. 38 is a schematic cross-sectional structural diagram of FIG. 37 taken along a direction of K-K'.
Figure 39:
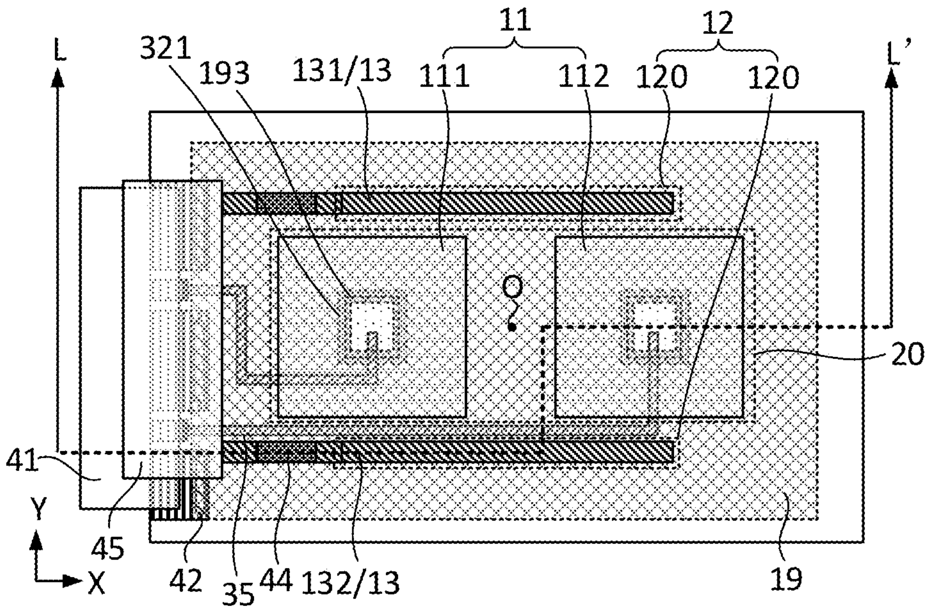
FIG. 39 is a schematic structural diagram of still another antenna according to an embodiment of the present disclosure.
Figure 40:
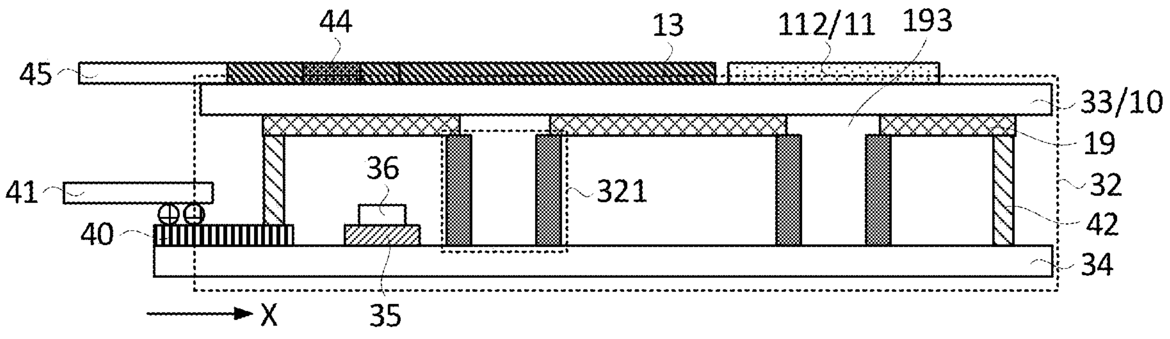
FIG. 40 is a schematic cross-sectional structural diagram of FIG. 39 taken along a direction of L-L'.

FIG. 37 is a schematic structural diagram of still another antenna according to an embodiment of the present disclosure, FIG. 38 is a schematic cross-sectional structural diagram of FIG. 37 taken along a direction of K-K', FIG. 39 is a schematic structural diagram of still another antenna according to an embodiment of the present disclosure, and FIG. 40 is a schematic cross-sectional structural diagram of FIG. 39 taken along a direction of L-L'. As shown in FIGS. 37 to 40, optionally, the antenna provided in the embodiments of the present disclosure further includes at least one impedance matching unit 44. The at least one impedance matching unit 44 is connected to the at least one microstrip line 13 in one-to-one correspondence. One impedance matching unit of the at least one impedance matching unit 44 includes at least one of a resistor, a capacitor or an inductor.

Specifically, as shown in FIGS. 37 to 40, each microstrip line 13 is correspondingly connected with an impedance matching unit 44. As described above, the radiating unit 11 is coupled to the microstrip line 13 to form a parasitic electric field when the radiating unit 11 is fed, and the impedance matching unit 44 is configured to adjust the load of the microstrip line 13. The difference in the load of the microstrip line 13 can adjust the difficulty degree of the parasitic electric field radiation on the microstrip line 13. In this manner, the intensity of the compensation electric field formed by coupling the parasitic electric field on the microstrip line 13 on the adjacent radiating unit 11 can be adjusted, so that the intensity of the compensation electric field matches the intensity of the coupled electric field formed by direct coupling on the radiating unit 11, thereby just counteracting the coupled electric field formed by direct coupling on the radiating unit 11, and minimizing the influence of the electric field generated by the operating radiating unit 11 on the electric field of the adjacent radiating unit 11.

Further, the impedance matching unit 44 may include at least one of a resistor, a capacitor or an inductor. For example, the impedance matching unit 44 may be an RLC circuit, specifically a circuit structure in which a resistor, a series of inductors, and a parallel capacitor are connected. The resistor may employ a variable resistor, and/or the capacitor may employ a variable capacitor and the like to achieve the flexible adjustment of the load, thereby achieving the dynamic compensation of the mutual coupled electric field between adjacent radiating units 11, so as to improve the stability of the indirect coupling field and ensure the decoupling effect.

With continued reference to FIGS. 37 to 40, the impedance matching unit 44 may be electrically connected to the control flexible circuit board 45, whereby the respective control integrated circuit is bound and connected to the control flexible circuit board 45, so as to enable the control integrated circuit to transmit a load control signal to the impedance matching unit 44 through the control flexible circuit board 45, adjust the load size of the impedance matching unit 44, and further, dynamically adjust in the control integrated circuit for the coupling between different radiating units 11, and integrate the compensation algorithm and the optimization algorithm to optimize the decoupling effect.

It should be noted that in the antenna structure provided in any one of the above-described embodiments, the microstrip lines 13 may be correspondingly connected so as to dynamically compensate the mutual coupled electric field between adjacent radiating units 11, improve the stability of the indirect coupled electric field, and ensure the decoupling effect, which may be set by those skilled in the art according to actual requirements, and will not be described in detail herein.

Figure 41:
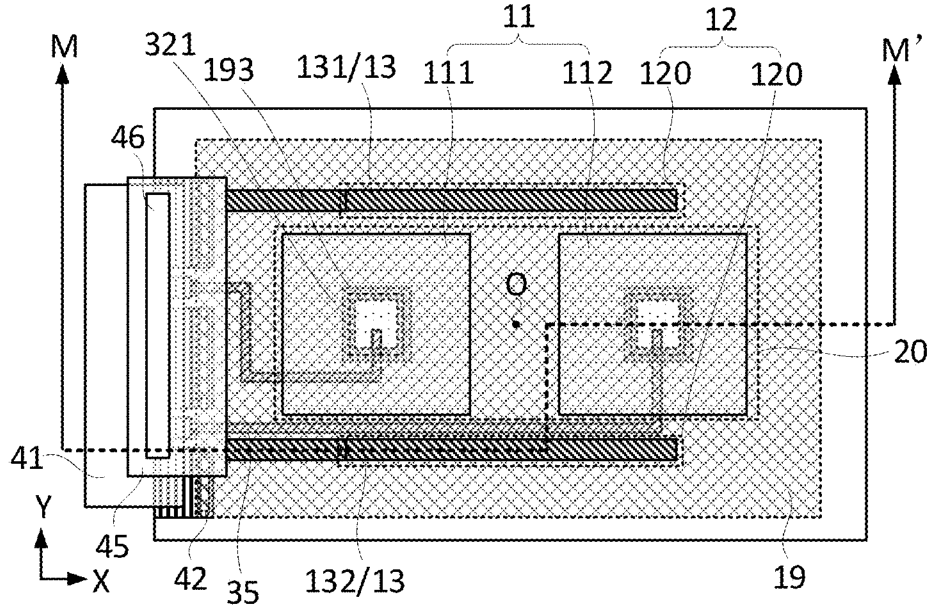
FIG. 41 is a schematic structural diagram of still another antenna according to an embodiment of the present disclosure.
Figure 42:
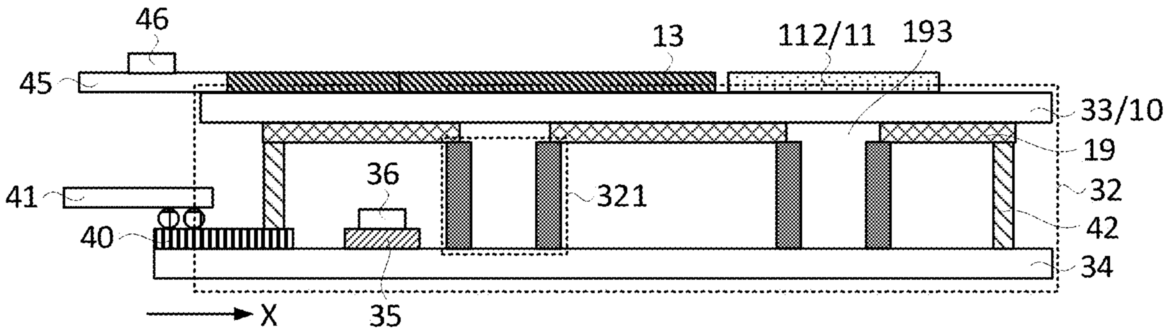
FIG. 42 is a schematic cross-sectional structural diagram of FIG. 41 taken along a direction of M-M'.
Figure 43:
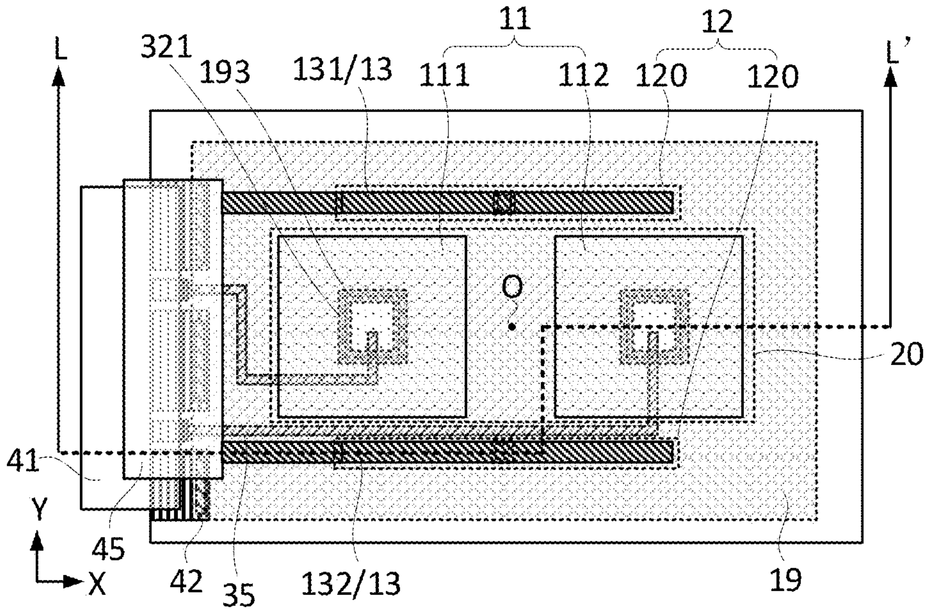
FIG. 43 is a schematic structural diagram of still another antenna according to an embodiment of the present disclosure.
Figure 44:
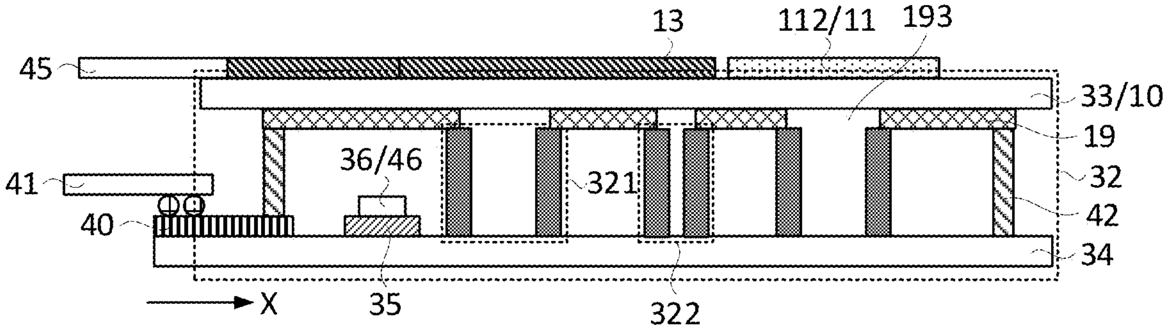
FIG. 44 is a schematic cross-sectional structural diagram of FIG. 43 taken along a direction of N-N'.

FIG. 41 is a schematic structural diagram of still another antenna according to an embodiment of the present disclosure, FIG. 42 is a schematic cross-sectional structural diagram of FIG. 41 taken along a direction of M-M', FIG. 43 is a schematic structural diagram of still another antenna according to an embodiment of the present disclosure, and FIG. 44 is a schematic cross-sectional structural diagram of FIG. 43 taken along a direction of N-N'. As shown in FIGS. 41 to 44, optionally, the antenna provided in the embodiments of the present disclosure further includes a radio frequency chip 46, the radio frequency chip 46 is electrically connected to the microstrip line 13 or is coupled to the microstrip line 13. The radio frequency chip 46 is configured to apply an additional radio frequency signal to the microstrip line 13.

Specifically, as shown in FIGS. 41 and 44, the antenna is further provided with a radio frequency chip 46, the radio frequency chip 46 may apply an additional radio frequency signal to the microstrip line 13 to form an extra additional electric field on the microstrip line 13, the additional electric field, after being superimposed with the parasitic electric field formed on the microstrip line 13, is coupled to form the compensation electric field on the radiating unit 11 so as to compensate for the coupled electric field formed by the direct coupling on the radiating unit 11. The intensity of the additional electric field, the waveform, and the like may be finely adjusted by the radio frequency chip 46 so as to match the intensity of the compensation electric field with the intensity of the coupled electric field formed by the direct coupling on the radiating unit 11, thereby just counteracting the coupled electric field formed by the direct coupling on the radiating unit 11, and achieving the optimal decoupling effect.

For example, if a strong compensation electric field is required to counteract the coupled electric field formed by the direct coupling on the radiating unit 11, then an additional electric field capable of forming a positive electric field enhancement for the parasitic electric field may be superimposed on the microstrip line 13 by the radio frequency chip 46. If a weaker compensation electric field is required to counteract the coupled electric field formed by the direct coupling on the radiating unit 11, then an additional electric field capable of forming a reverse electric field attenuation to the parasitic electric field may be superimposed on the microstrip line 13 by the radio frequency chip 46.

For another example, the waveform of the additional radio frequency signal may be adjusted by the radio frequency chip 46 to adjust the maximum radiation direction of the superimposed electric field on the microstrip line 13, so that the parasitic electric field on the microstrip line 13 may be superimposed with the additional electric field and then shifted to the desired radiation direction.

With the above-described technical schemes, the coupling between different radiating units 11 can be dynamically adjusted in the radio frequency chip 46, and the compensation algorithm and the optimization algorithm can be integrated to optimize the decoupling effect.

With continued reference to FIGS. 41 and 42, the microstrip line 13 may be electrically connected to the control flexible circuit board 45, whereby the radio frequency chip 46 is bound and connected to the control flexible circuit board 45, so as to enable the radio frequency chip 46 to transmit an additional radio frequency signal to the microstrip line 13 through the control flexible circuit board 45, and adjust the additional electric field on the microstrip line 13, and at this time, the radio frequency chip 46 is electrically connected to the microstrip line 13, and the coupling between different radiating units 11 can be dynamically adjusted in the radio frequency chip 46, and the compensation algorithm and the optimization algorithm may be integrated to optimize the decoupling effect.

With continued reference to FIGS. 43 and 44, the radio frequency chip 46 may be provided on the fifth substrate 34. The radio frequency chip 46 may transmit an additional radio frequency signal to the microstrip line 13 through an additional hollow waveguide 322 to adjust an additional electric field on the microstrip line 13, and in this manner, the radio frequency chip 46 is coupled to the microstrip line 13, so that the coupling between different radiating units 11 can be dynamically adjusted in the radio frequency chip 46, and the compensation algorithm and the optimization algorithm may be integrated to optimize the decoupling effect.

With continued reference to FIGS. 41 and 42, the radio frequency chip 46 may be a different chip from the antenna feed radio frequency chip 36, the antenna feed radio frequency chip 36 is configured to supply a radio frequency signal to the radiating unit 11, and the radio frequency chip 46 is configured to supply an additional radio frequency signal to the microstrip line 13, so that the above-described functions may be achieved by using a low-cost radio frequency chip.

With continued reference to FIGS. 43 and 44, the radio frequency chip 46 may also be the same chip as the antenna feed radio frequency chip 36, that is, a single chip may be used to simultaneously provide radio frequency signals to the radiating unit 11 and additional radio frequency signals to the microstrip line 13, thereby reducing the space occupied by the radio frequency chip and facilitating the high integration and the miniaturization design of the antenna.

It should be noted that the regulation of the parasitic electric field on the microstrip line 13 is not limited to the above-described embodiments. In other embodiments, the parasitic electric field on the microstrip line 13 may be regulated by connecting the microstrip line 13 to an externally mounted independent liquid crystal phase shifter. For example, a radio frequency connector such as an SMA interface or an SMP interface may be connected to one end of the microstrip line 13. A corresponding radio frequency connector is also disposed on the liquid crystal cell of the externally mounted liquid crystal phase shifter to achieve the connection between the microstrip line 13 and the externally mounted liquid crystal phase shifter, and further the parasitic electric field on the microstrip line 13 is regulated by the externally mounted liquid crystal phase shifter to optimize the decoupling effect, which is not specifically limited in this embodiment of the present disclosure.

Figure 45:
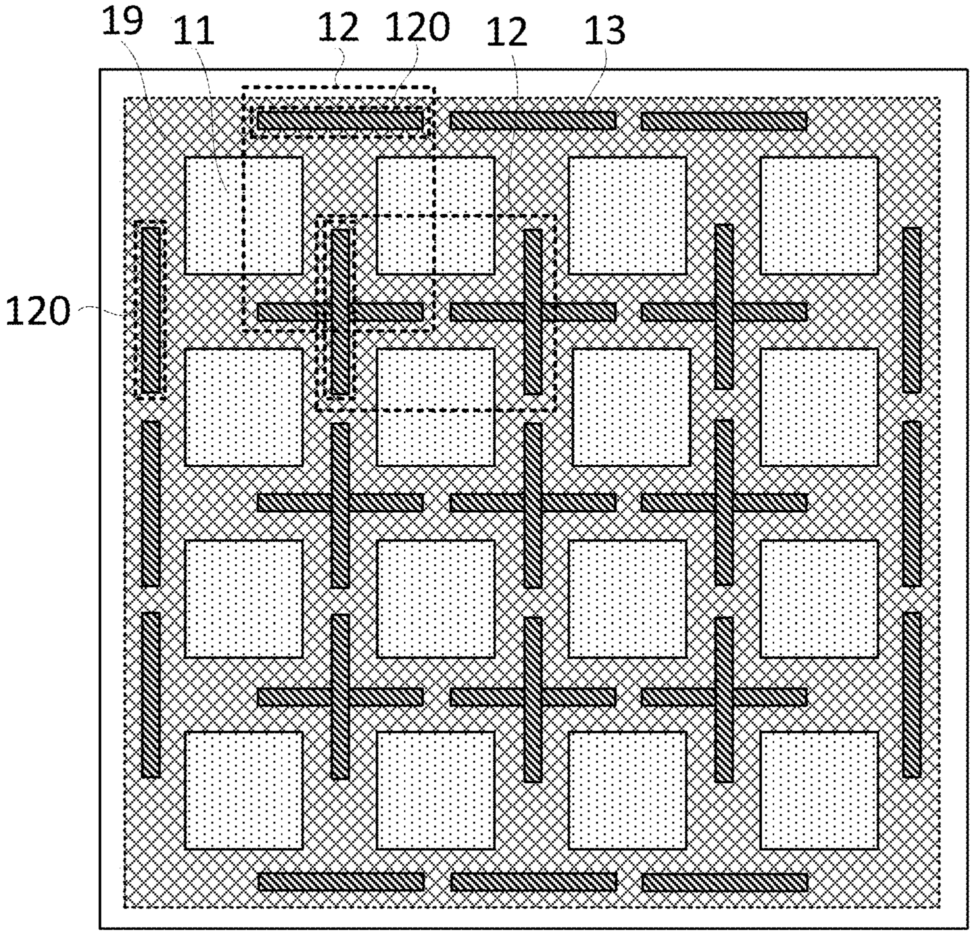
FIG. 45 is a schematic structural diagram of still another antenna according to an embodiment of the present disclosure.
Figure 46:
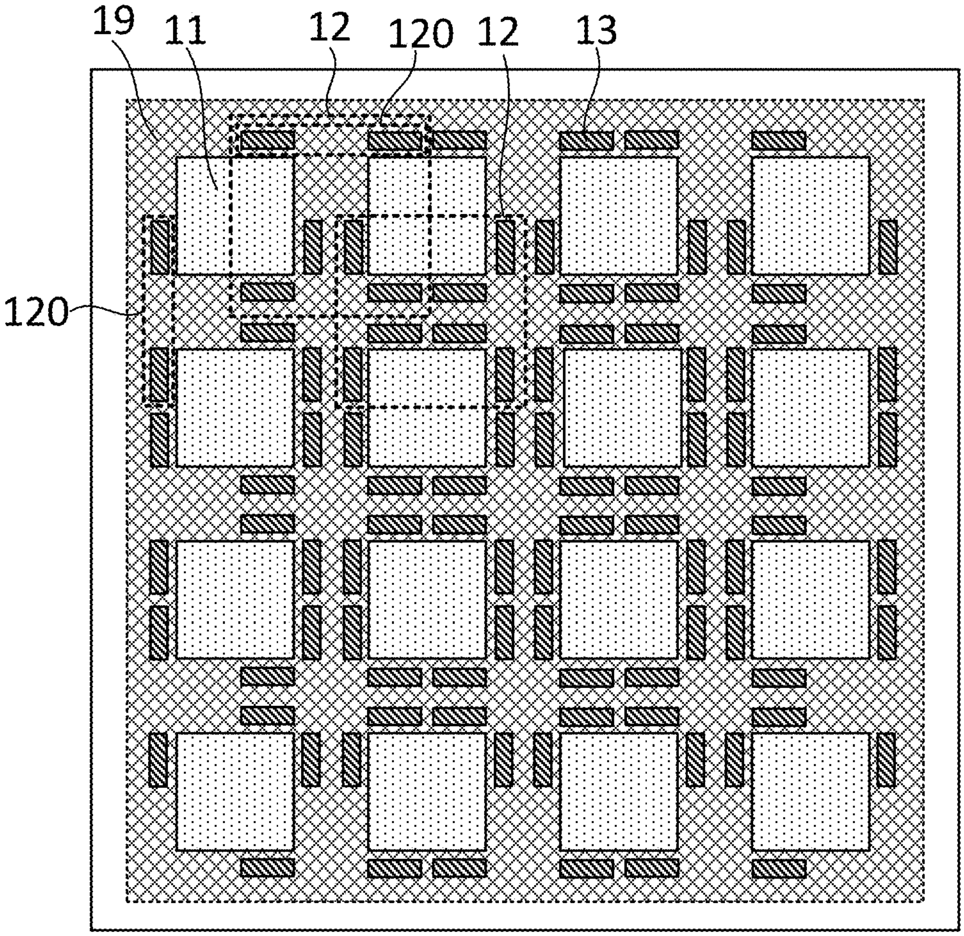
FIG. 46 is a schematic structural diagram of still another antenna according to an embodiment of the present disclosure.
Figure 47:
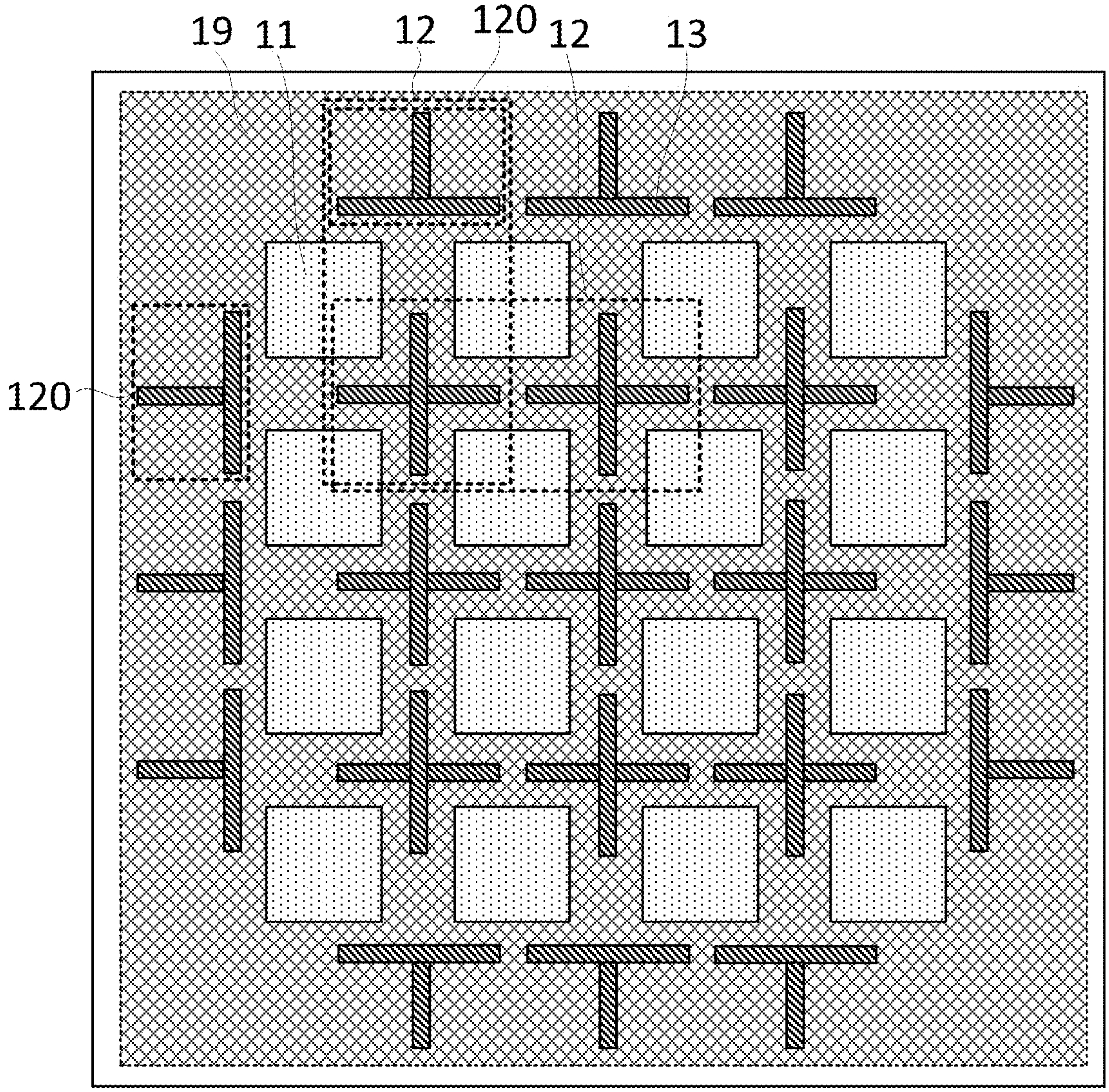
FIG. 47 is a schematic structural diagram of still another antenna according to an embodiment of the present disclosure.

FIG. 45 is a schematic structural diagram of still another antenna according to an embodiment of the present disclosure, FIG. 46 is a schematic structural diagram of still another antenna according to an embodiment of the present disclosure, and FIG. 47 is a schematic structural diagram of still another antenna according to an embodiment of the present disclosure. As shown in FIGS. 45 to 47, optionally, in any one row of radiating units 11, any two radiating units 11 disposed adjacent to each other are correspondingly provided with a respective decoupling structure 12. In any one column of radiating units 11, any two radiating units 11 disposed adjacent to each other are correspondingly provided with a respective decoupling structure 12.

Exemplarily, FIG. 45 shows a two-dimensional layout structure of a decoupling structure 12 composed of two microstrip lines 13 in an array of radiating units, FIG. 46 shows a two-dimensional layout structure of a decoupling structure 12 composed of four microstrip lines 13 in an array of radiating units, and FIG. 47 shows a two-dimensional layout structure of a decoupling structure 12 composed of a T-shaped microstrip line structure in an array of radiating units. As shown in FIG. 45 to 47, the antenna may be provided with multiple radiating units 11 arranged in an array. In each row of radiating units 11, any two adjacent radiating units 11 are correspondingly provided with a respective decoupling structure 12, and in each column of radiating units 11, any two adjacent radiating units 11 are correspondingly provided with a respective decoupling structure 12, so that a direct coupling field between any two adjacent radiating units 11 can be compensated and counteracted to reduce the mutual coupling between any two adjacent radiating units 11, the isolation between any adjacent radiating units 11 is improved, and further a problem that the antenna in which the radiating units 11 are closely placed may have strong mutual coupling between adjacent radiating units is solved, which is conductive to improving the integration of the antenna.

It should be noted that the number and layout of the radiating units 11 may be set according to actual requirements, which is not limited in the embodiments of the present disclosure.

With continued reference to FIGS. 45 and 47, optionally, at least one microstrip line 13 is shared between any two adjacent rows of radiating units 11, and at least one microstrip line 13 is shared between any two adjacent columns of radiating units 11.

Exemplarily, FIG. 45 shows a two-dimensional layout structure of a decoupling structure 12 composed of two microstrip lines 13 in an array of radiating units, where decoupling structures 12 provided correspondingly to any two adjacent rows of radiating units 11 may share at least one microstrip line unit 120, so that the space occupied by the decoupling structure 12 between the two adjacent rows of radiating units 11 may be reduced, thereby facilitating the high integration and the miniaturization design of the antenna while ensuring the isolation. Similarly, the decoupling structure 12 provided correspondingly to any two adjacent columns of radiating units 11 may share at least one microstrip line unit 120, so that the space occupied by the decoupling structure 12 between the two adjacent columns of radiating units 11 may be reduced, thereby facilitating the high integration and the miniaturization design of the antenna while ensuring the isolation.

FIG. 47 shows a two-dimensional layout structure of a decoupling structure 12 having a T-shaped microstrip line structure in an array of radiating units, where decoupling structure 12 provided correspondingly to any two adjacent rows of radiating units 11 may share at least one microstrip line 13, so that the space occupied by the decoupling structure 12 between the two adjacent rows of radiating units 11 may be reduced, thereby facilitating the high integration and the miniaturization design of the antenna while ensuring the isolation. Similarly, the decoupling structure 12 provided correspondingly to any two adjacent columns of radiating units 11 may also share at least one microstrip line 13, so that the space occupied by the decoupling structure 12 between the two adjacent columns of radiating units 11 may be reduced, thereby facilitating the high integration and the miniaturization design of the antenna while ensuring the isolation.

It should be noted that the two-dimensional layout structure of the decoupling structure 12 in the radiating unit array is not limited to the above-described embodiments. In other embodiments, the decoupling structure 12 may adopt other layout structures in the radiating unit array, which is not specifically limited in the embodiments of the present disclosure.

The antenna according to the embodiments of the present disclosure may be an antenna of a type such as a liquid crystal antenna and a phased array antenna, but is not limited thereto. It should be understood that, in any antenna having multiple radiating units, the decoupling structure provided in any one of the embodiments of the present disclosure may be used to reduce the mutual coupling between adjacent radiating units, improve the isolation between radiating units, and further solve a problem that the antenna in which the radiating units are closely placed may have strong mutual coupling between adjacent radiating units, which is conductive to improving the integration of the antenna.

The above implementations should not be construed as limiting the protection scope of the present disclosure. It should be understood by those skilled in the art that various modifications, combinations, sub-combinations and substitutions may be made depending on design requirements and other factors. Any modification, equivalent replacement, and improvement made within the spirit and principle of the present disclosure should be included within the protection scope of the present disclosure.

What is claimed is:

1. An antenna, comprising a first substrate, a plurality of radiating units and at least one decoupling structure, wherein, the plurality of radiating units are arranged in an array on a side of the first substrate;

at least two adjacent radiating units among the plurality of radiating units constitute one radiating unit group, and the radiating unit group comprises a first radiating unit and a second radiating unit disposed adjacent to each other;

the at least one decoupling structure is disposed in correspondence with the radiating unit group, one decoupling structure of the at least one decoupling structure comprises two microstrip line units, and one microstrip line unit of the two microstrip line units comprises at least one microstrip line;

the first radiating unit and the second radiating unit are disposed on a same layer and arranged in a first direction;

in a second direction, the two microstrip line units are located on two opposite sides of the radiating unit group, respectively, and a vertical projection of one microstrip line unit of the two microstrip line units on the first substrate and a vertical projection of other microstrip line unit of the two microstrip line units on the first substrate are symmetrically disposed about a center point of a vertical projection of the radiating unit group on the first substrate; and the second direction intersects the first direction.

2. The antenna of claim 1, wherein, the one microstrip line unit of the two microstrip line units comprises a first microstrip line, and the other microstrip line unit of the two microstrip line units comprises a second microstrip line;

the first microstrip line and the second microstrip line extend in an arrangement direction of the first radiating unit and the second radiating unit; and a vertical projection of the first microstrip line on the first substrate and a vertical projection of the second microstrip line on the first substrate are symmetrically disposed about the center point of the vertical projection of the radiating unit group on the first substrate.

3. The antenna of claim 1, wherein, the one microstrip line unit of the two microstrip line units comprises a third micro strip line and a fourth microstrip line arranged in the first direction, and the third microstrip line and the fourth microstrip line are insulated from each other; the other microstrip line unit of the two microstrip line units comprises a fifth microstrip line and a sixth microstrip line arranged in the first direction, and the fifth microstrip line and the sixth microstrip line are insulated from each other;

the third microstrip line, the fourth microstrip line, the fifth microstrip line and the sixth microstrip line extend in the first direction; and the third microstrip line and the fifth microstrip line at least partially overlaps with the first radiating unit in the second direction, and the fourth microstrip line and the sixth microstrip line at least partially overlaps with the second radiating unit in the second direction.

4. The antenna of claim 1, wherein the at least one microstrip line and the plurality of radiating units are disposed on a same layer.

5. The antenna of claim 1, wherein, the antenna further comprises a liquid crystal phase shifter located on a side of the first substrate facing away from the plurality of radiating units, the liquid crystal phase shifter comprises a second substrate and a third substrate disposed opposite to each other, and the third substrate is located on a side of the second substrate facing away from the plurality of radiating units;

the liquid crystal phase shifter further comprises a delay line, a liquid crystal layer and a ground metal layer;

the liquid crystal layer is located between the second substrate and the third substrate, the delay line is located between the third substrate and the liquid crystal layer, and the ground metal layer is located between the second substrate and the liquid crystal layer; and the ground metal layer comprises a first hollow portion, and one radiating unit of the plurality of radiating units cover the first hollow portion in a thickness direction of the first substrate.

6. The antenna of claim 5, wherein, the at least one microstrip line and the delay line are disposed on a same layer; and the ground metal layer comprises a second hollow portion, and the second hollow portion covers one microstrip line of the at least one microstrip line in the thickness direction of the first substrate.

7. The antenna of claim 5, wherein, the first substrate and the second substrate are bonded by a first bonding adhesive; and a gap exists between the first bonding adhesive and the plurality of radiating units in the thickness direction of the first substrate.

8. The antenna of claim 5, wherein the first substrate and the second substrate are a same substrate.

9. The antenna of claim 1, wherein, the antenna further comprises a ground metal layer and a coaxial cable interface;

the ground metal layer is located on a side of the first substrate facing away from the plurality of radiating units, and the ground metal layer at least partially overlaps with the plurality of radiating units in a thickness direction of the first substrate; and the coaxial cable interface is located on a side of the ground metal layer facing away from the plurality of radiating units, the first substrate comprises a first through hole, and the coaxial cable interface is connected to the plurality of radiating units through the first through hole.

10. The antenna of claim 1, wherein, the antenna further comprises a waveguide structure located on a side of the first substrate facing away from the plurality of radiating units, the waveguide structure comprises a fourth substrate and a fifth substrate disposed opposite to each other, and the fifth substrate is located on a side of the fourth substrate facing away from the plurality of radiating units;

the waveguide structure comprises a hollow waveguide tube and a ground metal layer;

the hollow waveguide tube is located between the fourth substrate and the fifth substrate, and the ground metal layer is located between the fourth substrate and the hollow waveguide tube;

the ground metal layer comprises a third hollow portion, one radiating unit of the plurality of radiating units covers the third hollow portion in a thickness direction of the first substrate, and the hollow waveguide tube at least partially overlaps with the third hollow portion in the thickness direction of the first substrate; and the hollow waveguide tube is configured to feed a radio frequency signal provided by a feed source to the plurality of radiating units.

11. The antenna of claim 10, wherein, the first substrate and the fourth substrate are bonded by a second bonding adhesive; and a gap exists between the second bonding adhesive and the plurality of radiating units in the thickness direction of the first substrate.

12. The antenna of claim 10, wherein the first substrate and the fourth substrate are a same substrate.

13. The antenna of claim 1, wherein the at least one microstrip line is floated, or the at least one microstrip line is grounded.

14. The antenna of claim 13, wherein, the antenna further comprises a ground metal layer;

the ground metal layer is located on a side of the first substrate facing away from the plurality of radiating units, and the ground metal layer at least partially overlaps with the plurality of radiating units in a thickness direction of the first substrate; and the first substrate comprises a second through hole, the second through hole at least partially overlaps with one microstrip line of the at least one microstrip line in the thickness direction of the first substrate, and the microstrip line of the at least one microstrip line is connected to the ground metal layer through the second through hole.

15. The antenna of claim 2, wherein, a side of the first microstrip line facing away from the radiating unit group is provided with a first drainage microstrip line, the first drainage microstrip line extends in the second direction, and one end of the first drainage microstrip line is connected to the first microstrip line at a center position of the first microstrip line;

a side of the second microstrip line facing away from the radiating unit group is provided with a second drainage microstrip line, the second drainage microstrip line extends in the second direction, and one end of the second drainage microstrip line is connected to the second microstrip line at a center position of the second microstrip line; and a vertical projection of the first drainage microstrip line on the first substrate and a vertical projection of the second drainage microstrip line on the first substrate are symmetrically disposed about the center point of the vertical projection of the radiating unit group on the first substrate.

16. The antenna of claim 15, wherein the first drainage microstrip line is grounded, and the second drainage microstrip line is grounded.

17. The antenna of claim 1, wherein, the antenna further comprises at least one impedance matching unit, and the at least one impedance matching unit is connected to the at least one microstrip line in one-to-one correspondence; and one impedance matching unit of the at least one impedance matching unit comprises at least one of a resistance, a capacitance or an inductance.

18. The antenna of claim 1, wherein the antenna further comprises a radio frequency chip, the radio frequency chip is electrically connected to the at least one microstrip line or is coupled to the at least one microstrip line, and the radio frequency chip is configured to apply an additional radio frequency signal to the at least one microstrip line.

19. The antenna of claim 1, wherein, in any one row of radiating units among the plurality of radiating units, any two radiating units disposed adjacent to each other are correspondingly provided with a respective decoupling structure; and in any one column of radiating units among the plurality of radiating units, any two radiating units disposed adjacent to each other are correspondingly provided with a respective decoupling structure.

20. The antenna of claim 19, wherein, at least one microstrip line is shared between any two adjacent rows of radiating units among the plurality of radiating units; and at least one microstrip line is shared between any two adjacent columns of radiating units among the plurality of radiating units.

* * * * *